(12) United States Patent
Smith

(10) Patent No.: US 11,384,756 B1
(45) Date of Patent: Jul. 12, 2022

(54) COMPOSITE VALVE SEAT SYSTEM AND METHOD

(71) Applicant: Vulcan Industrial Holdings, LLC, Houston, TX (US)

(72) Inventor: Jason David Smith, Porter, TX (US)

(73) Assignee: Vulcan Industrial Holdings, LLC, Houston, TX (US)

( * ) Notice: Subject to any disclaimer, the term of this patent is extended or adjusted under 35 U.S.C. 154(b) by 0 days.

(21) Appl. No.: 16/997,631

(22) Filed: Aug. 19, 2020

Related U.S. Application Data

(66) Substitute for application No. 16/746,519, filed on Jan. 17, 2020, now Pat. No. 10,774,828.

(51) Int. Cl.
  *F04B 53/10* (2006.01)
  *F16K 25/00* (2006.01)
  *F16K 15/06* (2006.01)

(52) U.S. Cl.
  CPC ...... *F04B 53/1022* (2013.01); *F04B 53/1087* (2013.01); *F16K 15/06* (2013.01);
  (Continued)

(58) Field of Classification Search
  CPC ......... Y10T 137/7904; Y10T 137/7929; Y10T 137/7559; Y10T 137/86019;
  (Continued)

(56) References Cited

U.S. PATENT DOCUMENTS

| | | | |
|---|---|---|---|
| 1,576,269 A | 3/1926 | Durant |
| 1,595,459 A | 8/1926 | Durant |

(Continued)

FOREIGN PATENT DOCUMENTS

| | | | |
|---|---|---|---|
| CN | 201149099 | ‡ | 11/2008 |
| CN | 102410194 | ‡ | 4/2012 |

(Continued)

OTHER PUBLICATIONS

Weir Oil & Gas, "SPM Well Service Pumps & Flow Control Products TWS600S Fluid End Operation Instruction and Service Manual," Feb. 27, 2017, https://www.global.weir/assets/files/oil%20and%20gas%20ebrochures/manuals/tws600s-fluid-end-2p121260.pdf, 41 pages.‡

(Continued)

*Primary Examiner* — Craig M Schneider
*Assistant Examiner* — Frederick D Soski
(74) *Attorney, Agent, or Firm* — Hogan Lovells US LLP

(57) ABSTRACT

A valve assembly for a fracturing pump includes a valve seat having a bore extending therethrough, the valve seat including a strike face at a top region opposite a bottom region, at least a portion of the strike face formed by an insert positioned within a groove formed in the valve body. The valve assembly also includes a bore liner arranged within the bore, at least a portion of an axial length of the bore liner covering at least a portion of the ceramic to form a barrier between the insert and the bore. The valve assembly further includes a valve member positioned to reciprocate within the bore, the valve member moving between an open position and a closed position, wherein at least a portion of the valve member engages at least a portion of the strike face in the closed position.

14 Claims, 7 Drawing Sheets

(52) U.S. Cl.
CPC .......... *F16K 25/005* (2013.01); *F04B 53/108* (2013.01); *Y10T 137/7559* (2015.04); *Y10T 137/7904* (2015.04); *Y10T 137/7929* (2015.04); *Y10T 137/86019* (2015.04)

(58) Field of Classification Search
CPC .............. F04B 53/1022; F04B 53/1087; F04B 53/108; F16K 15/06; F16K 27/005
See application file for complete search history.

(56) References Cited

U.S. PATENT DOCUMENTS

| | | | | |
|---|---|---|---|---|
| 1,671,139 | A ‡ | 5/1928 | Wilson | F16K 1/34 |
| | | | | 251/33 |
| 1,873,318 | A ‡ | 8/1932 | Eason, Jr. | F04B 53/1027 |
| | | | | 137/533.21 |
| 1,914,737 | A ‡ | 6/1933 | Elms | F04B 53/1027 |
| | | | | 251/175 |
| 1,948,628 | A ‡ | 2/1934 | Penick | F04B 53/1027 |
| | | | | 251/332 |
| 1,963,684 | A | 6/1934 | Shimer | |
| 1,963,685 | A | 6/1934 | Shimer | |
| 2,011,547 | A ‡ | 8/1935 | Joseph | F04B 53/1027 |
| | | | | 137/516.29 |
| 2,069,443 | A | 2/1937 | Hill | |
| 2,103,503 | A ‡ | 12/1937 | White | F04B 53/1027 |
| | | | | 137/329.04 |
| 2,103,504 | A | 12/1937 | White | |
| 2,143,399 | A ‡ | 1/1939 | Abercrombie | F04B 53/1022 |
| | | | | 137/540 |
| 2,304,991 | A ‡ | 12/1942 | Foster | F04B 53/1027 |
| | | | | 137/454.4 |
| 2,506,128 | A ‡ | 5/1950 | Ashton | F16K 31/143 |
| | | | | 251/12 |
| 2,547,831 | A ‡ | 4/1951 | Mueller | F16K 3/0227 |
| | | | | 251/17 |
| 2,713,522 | A | 7/1955 | Lorenz | |
| 2,719,737 | A | 10/1955 | Fletcher | |
| 2,745,631 | A ‡ | 5/1956 | Shellman | F04B 53/1027 |
| | | | | 251/175 |
| 2,756,960 | A | 7/1956 | Church | |
| 2,898,082 | A ‡ | 8/1959 | Von Almen | F04B 53/1027 |
| | | | | 251/333 |
| 2,969,951 | A ‡ | 1/1961 | Walton | F04B 53/1027 |
| | | | | 251/332 |
| 2,982,515 | A ‡ | 5/1961 | Rule | F16K 1/465 |
| | | | | 251/332 |
| 2,983,281 | A ‡ | 5/1961 | Bynum | F04B 53/1087 |
| | | | | 137/543.23 |
| 3,049,082 | A | 8/1962 | Barry | |
| 3,053,500 | A | 9/1962 | Atkinson | |
| 3,063,467 | A ‡ | 11/1962 | Roberts, Jr. | F16K 1/465 |
| | | | | 137/516.29 |
| 3,224,817 | A ‡ | 12/1965 | Carter | F16J 15/186 |
| | | | | 384/16 |
| 3,276,390 | A ‡ | 10/1966 | Bloudoff | F04B 53/14 |
| | | | | 92/61 |
| 3,288,475 | A | 11/1966 | Benoit | |
| 3,459,363 | A * | 8/1969 | Miller | F04B 49/243 |
| | | | | 417/446 |
| 3,474,808 | A ‡ | 10/1969 | Elliott | F16K 15/063 |
| | | | | 137/543 |
| 3,483,885 | A | 12/1969 | Leathers | |
| 3,489,098 | A | 1/1970 | Roth | |
| 3,489,170 | A * | 1/1970 | Leman | F04B 53/1087 |
| | | | | 251/363 |
| 3,512,787 | A | 5/1970 | Kennedy | |
| 3,809,508 | A ‡ | 5/1974 | Uchiyama | F04B 53/164 |
| | | | | 417/51 |
| 3,907,307 | A | 9/1975 | Maurer | |
| 3,931,755 | A | 1/1976 | Hatridge | |
| 4,044,834 | A ‡ | 8/1977 | Perkins | E21B 21/08 |
| | | | | 166/370 |
| 4,076,212 | A ‡ | 2/1978 | Leman | F16K 1/46 |
| | | | | 137/516.29 |
| 4,184,814 | A ‡ | 1/1980 | Parker | F04B 53/1027 |
| | | | | 137/454.4 |
| 4,219,204 | A | 8/1980 | Pippert | |
| 4,277,229 | A | 7/1981 | Pacht | |
| 4,331,741 | A | 5/1982 | Wilson | |
| 4,395,050 | A * | 7/1983 | Wirz | F16K 1/2263 |
| | | | | 251/332 |
| 4,398,731 | A | 8/1983 | Gorman | |
| 4,440,404 | A | 4/1984 | Roach | |
| 4,508,133 | A | 4/1985 | Hamid | |
| 4,518,329 | A ‡ | 5/1985 | Weaver | F04B 53/1027 |
| | | | | 137/516.25 |
| 4,518,359 | A | 5/1985 | Yao-Psong | |
| 4,527,806 | A | 7/1985 | Ungchusri | |
| 4,662,392 | A ‡ | 5/1987 | Vadasz | F16K 15/04 |
| | | | | 137/53 |
| 4,754,950 | A | 7/1988 | Tada | |
| 4,763,876 | A ‡ | 8/1988 | Oda | F01L 3/22 |
| | | | | 123/18 |
| 4,770,206 | A ‡ | 9/1988 | Sjoberg | F04B 53/1027 |
| | | | | 137/516.29 |
| 4,807,890 | A | 2/1989 | Gorman | |
| 4,811,758 | A | 3/1989 | Piper | |
| 4,861,241 | A | 8/1989 | Gamboa | |
| 4,919,719 | A | 4/1990 | Abe | |
| 4,951,707 | A ‡ | 8/1990 | Johnson | F16K 1/46 |
| | | | | 137/516.29 |
| 5,020,490 | A ‡ | 6/1991 | Seko | F01L 3/22 |
| | | | | 123/188.8 |
| 5,052,435 | A ‡ | 10/1991 | Crudup | F16K 15/063 |
| | | | | 137/516.29 |
| 5,061,159 | A ‡ | 10/1991 | Pryor | F04B 53/1002 |
| | | | | 417/55 |
| 5,062,450 | A ‡ | 11/1991 | Bailey | E21B 33/13 |
| | | | | 137/516.29 |
| 5,080,713 | A | 1/1992 | Ishibashi | |
| 5,088,521 | A ‡ | 2/1992 | Johnson | E21B 21/01 |
| | | | | 137/516.29 |
| 5,127,807 | A | 7/1992 | Eslinger | |
| 5,131,666 | A | 7/1992 | Hutchens | |
| 5,149,107 | A | 9/1992 | Maringer | |
| 5,209,495 | A ‡ | 5/1993 | Palmour | F04B 53/164 |
| | | | | 277/50 |
| 5,249,600 | A ‡ | 10/1993 | Blume | F04B 53/1087 |
| | | | | 137/516.29 |
| 5,267,736 | A | 12/1993 | Pietsch | |
| 5,273,570 | A | 12/1993 | Sato | |
| 5,314,659 | A | 5/1994 | Hidaka | |
| 5,478,048 | A | 12/1995 | Salesky | |
| 5,533,245 | A ‡ | 7/1996 | Stanton | B25B 27/06 |
| | | | | 29/213.1 |
| 5,540,570 | A ‡ | 7/1996 | Schuller | B60T 8/4031 |
| | | | | 417/54 |
| 5,572,920 | A | 11/1996 | Kennedy | |
| 5,626,345 | A | 5/1997 | Wallace | |
| 5,636,688 | A | 6/1997 | Bassinger | |
| 5,674,449 | A | 10/1997 | Liang | |
| 5,834,664 | A | 11/1998 | Aonuma | |
| 5,859,376 | A | 1/1999 | Ishibashi | |
| 5,895,517 | A | 4/1999 | Kawamura | |
| 5,949,003 | A | 9/1999 | Aoki | |
| 6,139,599 | A | 10/2000 | Takahashi | |
| 6,200,688 | B1 | 3/2001 | Liang | |
| 6,209,445 | B1 | 4/2001 | Roberts, Jr | |
| 6,328,312 | B1 | 12/2001 | Schmitz | |
| 6,340,377 | B1 | 1/2002 | Kawata | |
| 6,382,940 | B1 ‡ | 5/2002 | Blume | F04B 53/007 |
| | | | | 277/435 |
| 6,436,338 | B1 | 8/2002 | Qiao | |
| 6,460,620 | B1 ‡ | 10/2002 | LaFleur | E21B 21/106 |
| | | | | 137/881 |
| 6,464,749 | B1 | 10/2002 | Kawase | |
| 6,482,275 | B1 | 11/2002 | Qiao | |
| 6,485,678 | B1 | 11/2002 | Liang | |
| 6,544,012 | B1 | 4/2003 | Blume | |

(56) References Cited

U.S. PATENT DOCUMENTS

| | | | |
|---|---|---|---|
| 6,623,259 B1 ‡ | 9/2003 | Blume | F04B 53/007 137/543.23 |
| 6,641,112 B2 ‡ | 11/2003 | Antoff | F04B 53/1025 251/363 |
| 6,695,007 B2 ‡ | 2/2004 | Vicars | F16K 15/063 137/516.29 |
| 6,702,905 B1 | 3/2004 | Qiao | |
| 6,880,802 B2 | 4/2005 | Hara | |
| 6,910,871 B1 | 6/2005 | Blume | |
| 6,916,444 B1 | 7/2005 | Liang | |
| 6,951,165 B2 ‡ | 10/2005 | Kuhn | F04B 1/0426 92/129 |
| 6,951,579 B2 | 10/2005 | Koyama | |
| 6,955,181 B1 ‡ | 10/2005 | Blume | F16K 15/06 137/15.18 |
| 6,959,916 B2 | 11/2005 | Chigasaki | |
| 7,000,632 B2 | 2/2006 | McIntire | |
| 7,036,824 B2 | 5/2006 | Kunz | |
| 7,144,440 B2 | 12/2006 | Ando | |
| 7,168,440 B1 ‡ | 1/2007 | Blume | F04B 53/102 137/15.18 |
| 7,186,097 B1 ‡ | 3/2007 | Blume | F04B 53/007 417/45 |
| 7,222,837 B1 ‡ | 5/2007 | Blume | F16K 1/385 137/516.29 |
| 7,290,560 B2 | 11/2007 | Orr | |
| 7,296,591 B2 ‡ | 11/2007 | Moe | F04B 53/109 137/454.4 |
| 7,335,002 B2 | 2/2008 | Vicars | |
| 7,341,435 B2 ‡ | 3/2008 | Vicars | F04B 53/007 137/51 |
| 7,506,574 B2 ‡ | 3/2009 | Jensen | F04B 53/007 417/45 |
| 7,513,483 B1 ‡ | 4/2009 | Blume | F16K 1/34 137/516.29 |
| 7,513,759 B1 | 4/2009 | Blume | |
| 7,611,590 B2 | 11/2009 | Liang | |
| 7,681,589 B2 | 3/2010 | Schwegman | |
| 7,682,471 B2 | 3/2010 | Levin | |
| 7,726,026 B1 ‡ | 6/2010 | Blume | F16K 1/465 29/890 |
| 7,748,310 B2 | 7/2010 | Kennedy | |
| 7,754,142 B2 | 7/2010 | Liang | |
| 7,754,143 B2 | 7/2010 | Qiao | |
| 7,757,396 B2 | 7/2010 | Sawada | |
| 7,789,133 B2 | 9/2010 | McGuire | |
| 7,793,913 B2 | 9/2010 | Hara | |
| 7,828,053 B2 | 11/2010 | McGuire | |
| 7,845,413 B2 | 12/2010 | Shampine | |
| 7,861,738 B2 | 1/2011 | Erbes | |
| 7,866,346 B1 ‡ | 1/2011 | Walters | F04B 53/16 138/89 |
| 7,891,374 B2 | 2/2011 | Vicars | |
| 7,954,510 B2 | 6/2011 | Schwegman | |
| 7,992,635 B2 ‡ | 8/2011 | Cherewyk | E21B 43/26 166/75.15 |
| 8,069,923 B2 ‡ | 12/2011 | Blanco | F04B 53/22 166/30 |
| 8,075,661 B2 | 12/2011 | Chen | |
| 8,083,506 B2 ‡ | 12/2011 | Maki | F04B 5/02 417/56 |
| 8,100,407 B2 | 1/2012 | Stanton | |
| 8,141,849 B1 | 3/2012 | Blume | |
| 8,147,227 B1 | 4/2012 | Blume | |
| 8,181,970 B2 | 5/2012 | Smith | |
| 8,261,771 B2 | 9/2012 | Witkowski | |
| 8,287,256 B2 | 10/2012 | Shafer | |
| 8,291,927 B2 | 10/2012 | Johnson | |
| 8,317,498 B2 * | 11/2012 | Gambier | F04B 49/243 417/454 |
| 8,375,980 B2 | 2/2013 | Higashiyama | |
| 8,376,723 B2 | 2/2013 | Kugelev | |
| 8,402,880 B2 ‡ | 3/2013 | Patel | F04B 53/16 92/165 |
| 8,430,075 B2 | 4/2013 | Qiao | |
| D687,125 S | 7/2013 | Hawes | |
| 8,479,700 B2 | 7/2013 | Qiao | |
| 8,511,218 B2 | 8/2013 | Cordes | |
| 8,522,667 B2 | 9/2013 | Clemens | |
| 8,528,585 B2 ‡ | 9/2013 | McGuire | F16L 37/088 137/315.01 |
| 8,534,691 B2 | 9/2013 | Schaffer | |
| 8,613,886 B2 | 12/2013 | Qiao | |
| 8,662,864 B2 | 3/2014 | Bayyouk | |
| 8,662,865 B2 | 3/2014 | Bayyouk | |
| 8,668,470 B2 | 3/2014 | Bayyouk | |
| 8,707,853 B1 | 4/2014 | Dille | |
| 8,733,313 B2 | 5/2014 | Sato | |
| 8,784,081 B1 | 7/2014 | Blume | |
| 8,828,312 B2 | 9/2014 | Yao | |
| 8,870,554 B2 ‡ | 10/2014 | Kent | F04B 49/10 137/375 |
| 8,893,806 B2 | 11/2014 | Williamson | |
| 8,894,392 B1 | 11/2014 | Blume | |
| 8,915,722 B1 | 12/2014 | Blume | |
| 8,940,110 B2 | 1/2015 | Qiao | |
| 8,978,695 B2 | 3/2015 | Witkowkski | |
| 8,998,593 B2 | 4/2015 | Vicars | |
| 9,010,412 B2 | 4/2015 | McGuire | |
| 9,103,448 B2 | 8/2015 | Witkowski | |
| 9,150,945 B2 | 10/2015 | Bei | |
| 9,157,136 B2 | 10/2015 | Chou | |
| 9,157,468 B2 | 10/2015 | Dille | |
| 9,206,910 B2 | 12/2015 | Kahn | |
| D748,228 S | 1/2016 | Bayyouk | |
| 9,260,933 B2 | 2/2016 | Artherholt | |
| 9,261,195 B2 | 2/2016 | Toynbee | |
| 9,273,543 B2 | 3/2016 | Baca | |
| 9,284,631 B2 | 3/2016 | Radon | |
| 9,284,953 B2 | 3/2016 | Blume | |
| 9,285,040 B2 ‡ | 3/2016 | Forrest | B05B 9/0413 |
| 9,291,274 B1 | 3/2016 | Blume | |
| 9,322,243 B2 | 4/2016 | Baca | |
| 9,334,547 B2 | 5/2016 | Qiao | |
| 9,340,856 B2 | 5/2016 | Otobe | |
| 9,359,921 B2 | 6/2016 | Hashimoto | |
| 9,365,913 B2 | 6/2016 | Imaizumi | |
| 9,371,919 B2 | 6/2016 | Forrest | |
| 9,376,930 B2 | 6/2016 | Kim | |
| 9,377,019 B1 ‡ | 6/2016 | Blume | F04B 53/16 |
| 9,382,940 B2 | 7/2016 | Lee | |
| 9,416,887 B2 | 8/2016 | Blume | |
| 9,435,454 B2 ‡ | 9/2016 | Blume | F16K 25/005 |
| 9,441,776 B2 | 9/2016 | Bryne | |
| 9,458,743 B2 | 10/2016 | Qiao | |
| 9,464,730 B2 | 10/2016 | Bihlet | |
| 9,500,195 B2 | 11/2016 | Blume | |
| 9,506,382 B2 | 11/2016 | Yeager | |
| 9,528,508 B2 ‡ | 12/2016 | Thomeer | F04B 1/124 |
| 9,528,631 B2 ‡ | 12/2016 | McCarty | F16K 41/02 |
| 9,534,473 B2 | 1/2017 | Morris | |
| 9,534,691 B2 | 1/2017 | Miller | |
| 9,556,761 B2 | 1/2017 | Koyama | |
| 9,568,138 B2 | 2/2017 | Arizpe | |
| 9,605,767 B2 | 3/2017 | Chhabra | |
| 9,631,739 B2 | 4/2017 | Belshan | |
| D787,029 S | 5/2017 | Bayyouk | |
| 9,638,075 B2 | 5/2017 | Qiao | |
| 9,638,337 B2 | 5/2017 | Witkowski | |
| 9,650,882 B2 | 5/2017 | Zhang | |
| 9,651,067 B2 | 5/2017 | Beschorner | |
| 9,689,364 B2 | 6/2017 | Mack | |
| 9,695,812 B2 | 7/2017 | Dille | |
| 9,732,746 B2 | 8/2017 | Chandrasekaran | |
| 9,732,880 B2 | 8/2017 | Haines | |
| 9,745,968 B2 | 8/2017 | Kotapish | |
| 9,784,262 B2 | 10/2017 | Bayyouk | |
| 9,822,894 B2 ‡ | 11/2017 | Bayyouk | F16K 25/005 |
| 9,845,801 B1 | 12/2017 | Shek | |
| 9,857,807 B2 | 1/2018 | Baca | |
| 9,915,250 B2 | 3/2018 | Brasche | |

(56) References Cited

U.S. PATENT DOCUMENTS

| | | |
|---|---|---|
| 9,920,615 B2 | 3/2018 | Zhang |
| 9,927,036 B2 ‡ | 3/2018 | Dille ..................... F16K 1/42 |
| 9,945,362 B2 | 4/2018 | Skurdalsvold |
| 9,945,375 B2 | 4/2018 | Zhang |
| 9,989,044 B2 | 6/2018 | Bayyouk |
| 10,029,540 B2 | 7/2018 | Seeger |
| 10,041,490 B1 | 8/2018 | Jahnke |
| 10,082,137 B2 | 9/2018 | Graham |
| 10,094,478 B2 | 10/2018 | Iijima |
| 10,113,679 B2 | 10/2018 | Shuck |
| 10,184,470 B2 | 1/2019 | Barnett, Jr. |
| 10,190,197 B2 | 1/2019 | Baker |
| 10,197,172 B2 | 2/2019 | Fuller |
| 10,215,172 B2 | 2/2019 | Wood |
| 10,221,848 B2 ‡ | 3/2019 | Bayyouk ............ F04B 53/1087 |
| 10,240,594 B2 | 3/2019 | Barnhouse, Jr. |
| 10,240,597 B2 * | 3/2019 | Bayyouk ................ F04B 53/16 |
| 10,247,182 B2 | 4/2019 | Zhang |
| 10,247,184 B2 | 4/2019 | Chunn |
| 10,273,954 B2 | 4/2019 | Brown |
| 10,288,178 B2 | 5/2019 | Nowell |
| 10,316,832 B2 | 6/2019 | Byrne |
| 10,330,097 B2 | 6/2019 | Skurdalsvold |
| 10,344,757 B1 ‡ | 7/2019 | Stark ...................... B22F 7/08 |
| 10,364,487 B2 | 7/2019 | Park |
| D856,498 S | 8/2019 | Bayyouk |
| 10,378,535 B2 | 8/2019 | Mahmood |
| 10,378,538 B2 | 8/2019 | Blume |
| 10,393,113 B2 | 8/2019 | Wagner |
| 10,400,764 B2 * | 9/2019 | Wagner ................ F04B 53/162 |
| 10,415,348 B2 | 9/2019 | Zhang |
| 10,428,406 B2 | 10/2019 | Yao |
| 10,428,949 B2 | 10/2019 | Miller |
| 10,436,193 B1 | 10/2019 | Jahnke |
| 10,443,456 B2 | 10/2019 | Hoeg |
| 10,465,680 B1 | 11/2019 | Guerra |
| 10,472,702 B2 | 11/2019 | Yeh |
| 10,487,528 B2 | 11/2019 | Pozybill |
| 10,519,070 B2 | 12/2019 | Sanders |
| 10,519,950 B2 | 12/2019 | Foster |
| 10,526,862 B2 | 1/2020 | Witkowski |
| 10,527,036 B2 | 1/2020 | Blume |
| 10,557,446 B2 | 2/2020 | Stecklein |
| 10,557,576 B2 | 2/2020 | Witkowski |
| 10,557,580 B2 | 2/2020 | Mendyk |
| 10,563,494 B2 | 2/2020 | Graham |
| 10,563,649 B2 | 2/2020 | Zhang |
| 10,570,491 B2 | 2/2020 | Hong |
| 10,576,538 B2 | 3/2020 | Kato |
| 10,577,580 B2 | 3/2020 | Abbas |
| 10,577,850 B2 | 3/2020 | Ozkan |
| 10,591,070 B2 | 3/2020 | Nowell |
| 10,605,374 B2 | 3/2020 | Takaki |
| 10,626,856 B2 | 4/2020 | Coldren |
| 10,633,925 B2 | 4/2020 | Panda |
| 10,634,260 B2 | 4/2020 | Said |
| 10,640,854 B2 | 5/2020 | Hu |
| 10,655,623 B2 * | 5/2020 | Blume ................. F04B 1/145 |
| 10,663,071 B2 * | 5/2020 | Bayyouk ................ F16K 1/42 |
| 10,670,013 B2 | 6/2020 | Foster |
| 10,670,153 B2 | 6/2020 | Filipow |
| 10,670,176 B2 | 6/2020 | Byrne |
| 10,677,109 B2 | 6/2020 | Qiao |
| 10,677,240 B2 | 6/2020 | Graham |
| 10,677,365 B2 | 6/2020 | Said |
| 10,711,754 B2 | 7/2020 | Nelson |
| 10,711,778 B2 | 7/2020 | Buckley |
| 10,718,441 B2 | 7/2020 | Myers |
| 10,731,523 B2 | 8/2020 | Qu |
| 10,731,643 B2 | 8/2020 | DeLeon |
| 10,738,928 B2 | 8/2020 | Arizpe |
| 10,753,490 B2 | 8/2020 | Fuller |
| 10,753,495 B2 | 8/2020 | Bayyouk |
| 10,767,520 B1 | 9/2020 | Hattiangadi |
| 10,774,828 B1 | 9/2020 | Smith |
| 10,781,803 B2 | 9/2020 | Kumar |
| 10,787,725 B2 | 9/2020 | Fujieda |
| 10,801,627 B2 | 10/2020 | Warbey |
| 10,808,488 B2 | 10/2020 | Witkowski |
| 10,815,988 B2 | 10/2020 | Buckley |
| 10,830,360 B2 | 11/2020 | Frank |
| 10,851,775 B2 | 12/2020 | Stark |
| 10,865,325 B2 | 12/2020 | Nakao |
| 10,907,738 B2 | 2/2021 | Nowell |
| 10,914,171 B2 | 2/2021 | Foster |
| 10,934,899 B2 | 3/2021 | Hattiangadi |
| 10,941,866 B2 | 3/2021 | Nowell |
| 10,954,938 B2 * | 3/2021 | Stark ..................... F16K 1/42 |
| 10,961,607 B2 | 3/2021 | Oshima |
| 10,962,001 B2 | 3/2021 | Nowell |
| D916,240 S | 4/2021 | Nowell |
| 10,968,717 B2 | 4/2021 | Tran |
| 10,988,834 B2 | 4/2021 | Lee |
| 10,989,321 B2 | 4/2021 | Hattiangadi |
| 10,995,738 B2 | 5/2021 | Blume |
| 11,028,662 B2 | 6/2021 | Rhodes |
| 11,041,570 B1 | 6/2021 | Buckley |
| 11,078,903 B2 * | 8/2021 | Nowell .................. F16K 1/427 |
| 11,104,981 B2 | 8/2021 | Chen |
| 11,105,185 B2 | 8/2021 | Spencer |
| 11,105,327 B2 * | 8/2021 | Hurst ................. F04B 53/1022 |
| 11,105,328 B2 | 8/2021 | Bryne |
| 11,105,428 B2 | 8/2021 | Warbey |
| 11,111,915 B2 * | 9/2021 | Bayyouk ............. F16K 15/026 |
| 11,131,397 B2 | 9/2021 | Yan |
| D933,104 S | 10/2021 | Ellisor |
| D933,105 S | 10/2021 | Ellisor |
| D933,106 S | 10/2021 | Mullins |
| D933,107 S | 10/2021 | Mullins |
| 11,149,514 B2 | 10/2021 | Witkowski |
| 11,162,859 B2 | 11/2021 | Lei |
| 11,181,101 B2 | 11/2021 | Byrne |
| 11,181,108 B2 * | 11/2021 | Brooks ................. F04B 53/22 |
| 11,231,111 B2 * | 1/2022 | Hurst .................... F04B 53/22 |
| 11,242,849 B1 | 2/2022 | Smith |
| 2002/0084004 A1 | 7/2002 | Takahashi |
| 2002/0124961 A1 | 9/2002 | Porter |
| 2002/0159914 A1 | 10/2002 | Yeh |
| 2003/0205864 A1 ‡ | 11/2003 | Dietle ................... F04B 47/00 |
| 2003/0233910 A1 | 12/2003 | Jeong |
| 2004/0170507 A1 ‡ | 9/2004 | Vicars ................. F04B 53/007 |
| | | 417/360 |
| 2004/0194576 A1 | 10/2004 | Ando |
| 2004/0234404 A1 ‡ | 11/2004 | Vicars ................. F04B 53/102 |
| | | 417/571 |
| 2004/0255410 A1 | 12/2004 | Schonewille |
| 2004/0258557 A1 | 12/2004 | Shun |
| 2005/0095156 A1 | 5/2005 | Wolters |
| 2005/0200081 A1 ‡ | 9/2005 | Stanton ................ F16J 15/183 |
| | | 277/51 |
| 2005/0226754 A1 ‡ | 10/2005 | Orr ..................... F04B 53/007 |
| | | 417/571 |
| 2006/0002806 A1 | 1/2006 | Baxter |
| 2006/0027779 A1 | 2/2006 | McGuire |
| 2006/0045782 A1 ‡ | 3/2006 | Kretzinger ............ F04B 53/16 |
| | | 417/55 |
| 2007/0086910 A1 | 4/2007 | Liang |
| 2007/0154342 A1 | 7/2007 | Tu |
| 2007/0273105 A1 | 11/2007 | Stanton |
| 2007/0295411 A1 * | 12/2007 | Schwegman ......... F16K 15/063 |
| | | 137/542 |
| 2008/0031769 A1 | 2/2008 | Yeh |
| 2008/0092384 A1 | 4/2008 | Schaake |
| 2008/0279706 A1 ‡ | 11/2008 | Gambier ............ F04B 53/1025 |
| | | 417/45 |
| 2009/0041611 A1 | 2/2009 | Sathian |
| 2009/0261575 A1 ‡ | 10/2009 | Bull ................... F16L 27/1275 |
| | | 285/32 |
| 2009/0278069 A1 ‡ | 11/2009 | Blanco ................ F16K 15/063 |
| | | 251/309 |
| 2010/0272597 A1 | 12/2010 | Qiao |
| 2011/0079302 A1 ‡ | 4/2011 | Hawes ................. F04B 53/102 |
| | | 137/538 |

(56) References Cited

U.S. PATENT DOCUMENTS

| | | | |
|---|---|---|---|
| 2011/0142701 A1 | 6/2011 | Small | |
| 2011/0189040 A1 | 8/2011 | Vicars | |
| 2011/0255993 A1‡ | 10/2011 | Ochoa | F04B 53/162 417/53 |
| 2012/0141308 A1 | 6/2012 | Saini | |
| 2012/0163969 A1 | 6/2012 | Ongole | |
| 2012/0304821 A1 | 12/2012 | Ando | |
| 2013/0020521 A1‡ | 1/2013 | Byrne | F16K 1/385 251/334 |
| 2013/0202457 A1 | 8/2013 | Bayyouk | |
| 2013/0202458 A1‡ | 8/2013 | Byrne | F04B 7/02 417/279 |
| 2013/0319220 A1 | 12/2013 | Luharuka | |
| 2014/0083541 A1 | 3/2014 | Chandrasekaran | |
| 2014/0083547 A1 | 3/2014 | Hwang | |
| 2014/0196883 A1 | 7/2014 | Artherholt | |
| 2014/0260954 A1 | 9/2014 | Young | |
| 2014/0286805 A1‡ | 9/2014 | Dyer | F04B 49/22 417/57 |
| 2014/0322034 A1 | 10/2014 | Bayyouk | |
| 2014/0348677 A1 | 11/2014 | Moeller | |
| 2015/0132157 A1 | 5/2015 | Whaley | |
| 2015/0144826 A1‡ | 5/2015 | Bayyouk | F16K 25/005 251/359 |
| 2015/0147194 A1‡ | 5/2015 | Foote | F04B 53/16 417/53 |
| 2015/0219096 A1‡ | 8/2015 | Jain | F04B 53/162 417/44 |
| 2015/0300332 A1‡ | 10/2015 | Kotapish | F04B 1/12 417/53 |
| 2015/0368775 A1 | 12/2015 | Baker | |
| 2016/0201169 A1 | 7/2016 | Vecchio | |
| 2016/0215588 A1* | 7/2016 | Belshan | F16K 1/38 |
| 2016/0238156 A1‡ | 8/2016 | Hubenschmidt | F16K 37/0008 |
| 2016/0245280 A1 | 8/2016 | Todorov | |
| 2016/0319626 A1 | 11/2016 | Dille | |
| 2016/0319805 A1* | 11/2016 | Dille | F04B 11/00 |
| 2017/0067459 A1‡ | 3/2017 | Bayyouk | B23P 6/00 |
| 2017/0089473 A1‡ | 3/2017 | Nowell | F16K 5/0485 |
| 2017/0097107 A1‡ | 4/2017 | Hotz | F16K 41/02 |
| 2017/0159655 A1* | 6/2017 | Morreale | F04B 53/1087 |
| 2017/0218951 A1 | 8/2017 | Graham | |
| 2017/0218993 A1 | 8/2017 | Freed | |
| 2017/0297149 A1 | 10/2017 | Shinohara | |
| 2017/0298932 A1‡ | 10/2017 | Wagner | F04B 53/22 |
| 2017/0314097 A1 | 11/2017 | Hong | |
| 2017/0342776 A1 | 11/2017 | Bullock | |
| 2017/0342976 A1 | 11/2017 | Reddy | |
| 2018/0017173 A1 | 1/2018 | Nowell | |
| 2018/0058431 A1* | 3/2018 | Blume | F04B 53/1087 |
| 2018/0202434 A1 | 7/2018 | Bamhouse, Jr. | |
| 2018/0298894 A1* | 10/2018 | Wagner | F04B 53/22 |
| 2018/0312946 A1 | 11/2018 | Gigliotti, Jr | |
| 2018/0320258 A1 | 11/2018 | Stewart | |
| 2018/0340245 A1 | 11/2018 | Kemion | |
| 2018/0354081 A1 | 12/2018 | Kalyani | |
| 2019/0011051 A1 | 1/2019 | Yeung | |
| 2019/0017503 A1‡ | 1/2019 | Foster | F04B 53/16 |
| 2019/0024198 A1 | 1/2019 | Hong | |
| 2019/0024225 A1 | 1/2019 | Tang | |
| 2019/0032685 A1 | 1/2019 | Foster | |
| 2019/0032720 A1 | 1/2019 | Bayyouk | |
| 2019/0047049 A1 | 2/2019 | Fujieda | |
| 2019/0049052 A1 | 2/2019 | Shuck | |
| 2019/0063427 A1 | 2/2019 | Nowell | |
| 2019/0063430 A1* | 2/2019 | Byrne | F04B 1/0443 |
| 2019/0071755 A1 | 3/2019 | Lee | |
| 2019/0072088 A1 | 3/2019 | DeLeon | |
| 2019/0072089 A1* | 3/2019 | Buckley | F04B 1/0461 |
| 2019/0085806 A1 | 3/2019 | Meibgeier | |
| 2019/0085978 A1 | 3/2019 | Chase | |
| 2019/0101109 A1 | 4/2019 | Cortes | |
| 2019/0107226 A1 | 4/2019 | Bayyouk | |
| 2019/0120389 A1* | 4/2019 | Foster | F16K 1/385 |
| 2019/0136842 A1 | 5/2019 | Nowell | |
| 2019/0145400 A1 | 5/2019 | Graham | |
| 2019/0145568 A1‡ | 5/2019 | Nick | E21B 33/038 138/96 R |
| 2019/0154033 A1 | 5/2019 | Brooks | |
| 2019/0170137 A1 | 6/2019 | Chase | |
| 2019/0170138 A1 | 6/2019 | Bayyouk | |
| 2019/0194786 A1 | 6/2019 | Chuang | |
| 2019/0226058 A1 | 7/2019 | Fujieda | |
| 2019/0242373 A1 | 8/2019 | Wernig | |
| 2019/0264683 A1 | 8/2019 | Smith | |
| 2019/0292633 A1 | 9/2019 | Porret | |
| 2019/0301314 A1 | 10/2019 | Kamo | |
| 2019/0301447 A1 | 10/2019 | Skurdalsvold | |
| 2019/0316685 A1‡ | 10/2019 | Wang | F16K 15/063 |
| 2019/0376508 A1 | 12/2019 | Wagner | |
| 2020/0056272 A1 | 2/2020 | Hong | |
| 2020/0063899 A1 | 2/2020 | Witkowkski | |
| 2020/0080660 A1 | 3/2020 | Dyer | |
| 2020/0080661 A1 | 3/2020 | Mullins | |
| 2020/0157663 A1 | 5/2020 | Yang | |
| 2020/0158123 A1 | 5/2020 | Chen | |
| 2020/0173317 A1 | 6/2020 | Keating | |
| 2020/0023245 A1 | 7/2020 | Blume | |
| 2020/0208776 A1 | 7/2020 | Bayyouk | |
| 2020/0217424 A1 | 7/2020 | Rasmussen | |
| 2020/0240531 A1 | 7/2020 | Nowell | |
| 2020/0256149 A1 | 8/2020 | Witkowski | |
| 2020/0284253 A1 | 9/2020 | Foster | |
| 2020/0284365 A1 | 9/2020 | Bayyouk | |
| 2020/0290118 A1 | 9/2020 | Chen | |
| 2020/0291731 A1 | 9/2020 | Haiderer | |
| 2020/0300240 A1 | 9/2020 | Nowell | |
| 2020/0308683 A1 | 10/2020 | Xue | |
| 2020/0347843 A1 | 11/2020 | Mullins | |
| 2020/0355182 A1 | 11/2020 | DeLeon | |
| 2020/0392613 A1 | 12/2020 | Won | |
| 2020/0393054 A1 | 12/2020 | Fuller | |
| 2020/0399979 A1 | 12/2020 | Webster | |
| 2020/0400003 A1 | 12/2020 | Webster | |
| 2020/0400130 A1 | 12/2020 | Poehls | |
| 2020/0400132 A1 | 12/2020 | Kumar | |
| 2020/0400140 A1 | 12/2020 | Bayyouk | |
| 2020/0400242 A1 | 12/2020 | Spencer | |
| 2021/0010113 A1 | 1/2021 | Qiao | |
| 2021/0010470 A1 | 1/2021 | Blume | |
| 2021/0017830 A1 | 1/2021 | Witkowski | |
| 2021/0017982 A1 | 1/2021 | Bayyouk | |
| 2021/0017983 A1 | 1/2021 | Myers | |
| 2021/0040836 A1 | 2/2021 | Baskin | |
| 2021/0054486 A1 | 2/2021 | Kim | |
| 2021/0102630 A1 | 4/2021 | Nowell | |
| 2021/0108734 A1 | 4/2021 | Nowell | |
| 2021/0130936 A1 | 5/2021 | Wu | |
| 2021/0148471 A1 | 5/2021 | Murugesan | |
| 2021/0180156 A1 | 6/2021 | Kim | |
| 2021/0190053 A1 | 6/2021 | Wagner | |
| 2021/0190223 A1 | 6/2021 | Bayyouk | |
| 2021/0197524 A1 | 7/2021 | Maroli | |
| 2021/0215071 A1 | 7/2021 | Oikawa | |
| 2021/0215154 A1 | 7/2021 | Nowell | |
| 2021/0230987 A1 | 7/2021 | Tanner | |
| 2021/0239111 A1* | 8/2021 | Zitting | F04B 53/10 |
| 2021/0246537 A1 | 8/2021 | Maroli | |
| 2021/0260704 A1 | 8/2021 | Hu | |
| 2021/0270261 A1 | 9/2021 | Zhang | |
| 2021/0285551 A1 | 9/2021 | Renollett | |
| 2021/0310484 A1 | 10/2021 | Myers | |
| 2021/0381504 A1 | 12/2021 | Wagner | |
| 2021/0381615 A1 | 12/2021 | Riedel | |
| 2021/0388832 A1 | 12/2021 | Byrne | |

FOREIGN PATENT DOCUMENTS

| | | | |
|---|---|---|---|
| CN | 102748483 | ‡ | 10/2012 |
| CN | 102410194 | | 4/2021 |

(56) References Cited

FOREIGN PATENT DOCUMENTS

| DE | 0414955 A1 | * | 1/1989 | ............. | F04B 21/04 |
|----|-----------|---|--------|---------------|------------|
| EP | 0414955   | ‡ | 3/1991 | | |

OTHER PUBLICATIONS

White Star Pump Co., "Maintenance Manual: Triplex Pump WS-1300/1600," 2005, http://www.whitestarpump.com/ES/docs/user_t.pdf, 45 pages.‡
Flowserve, "Dynamic Balance Plug Valve and Double DB Plug Valve: Installation, Operation and Maintenance," 2011, https://www.flowserve.com/sites/default/files/2016-07/NVENIM2005-00_0.pdf, 36 pages.‡
U.S. Appl. No. 16/814,267, 194 pages.
U.S. Appl. No. 17/120,121, 110 pages.
U.S. Appl. No. 62/234,483, 45 pages.
U.S. Appl. No. 62/315,343, 41 pages.
U.S. Appl. No. 62/318,542, 44 pages.
U.S. Appl. No. 62/346,915, 41 pages.
U.S. Appl. No. 62/379,462, 24 pages.
"Flush Free Sealing Benefits," Oct. 3, 2011, http://empoweringpumps.com/flush-free-sealing-benefits/, accessed May 9, 2020, 5 pages.
Gardner Denver, Well Servicing Pump Model GD-3000—Operating and Service Manual, Apr. 2011, 44 pages.
Gardner Denver, Well Servicing Pump Model GD-1000Q—Fluid End Parts List, Sep. 2011, 24 pages.
Gardner Denver, Well Servicing Pump Model HD-2250—Operating and Service Manual, Jan. 2005, 44 pages.
Gardner Denver, Gd 2500Q HDF Frac & Well Service Pump, 3 Pages.
Cutting Tool Engineering, "Groove milling," Aug. 1, 2012, https://www.ctemag.cojm/news/articles/groove-milling, accessed May 13, 2020, 11 pages.
Vargususa, "Groovex Innovative Grooving Solutions—Groove Milling," Dec. 12, 2011, http://www.youtube.com/watch?v=vrFxHJUXjvk, 68 pages.
Kerr Pumps, Kerr KA-3500B/KA-3500BCB Plunger Pump Parts and Service Manual, 41 pages.
Kerr Pumps, Kerr KD-1250B/KD-1250BCB Plunger Pump Service Manual, 38 pages.
Kerr Pumps, Kerr KJ-2250B and KJ-2250BCB Plunger Pump Service Manual, 38 pages.
Kerr Pumps, Kerr KM-3250B/KM-3250BCB Plunger Pump Service Manual, 35 pages.
Kerr Pumps, Kerr KP-3300B/KP-3300BCB Plunger Pump Service Manual, 41 pages.
Kerr Pumps, Kerr KT-3350B/BCB KT-3400BCB Plunger Pump Service Manual, 46 pages.
Kerr Pumps, Kerr triplex pump km3250bcb 10,000 psi @ 5.1 gmp, Feb. 2, 2021, http://imged.com/kerr-triplex-pump-km3250bcb-10-000-psi-5-1-gmp-8234739.html, 2 pages.
Lex Machina, 77 Federal district court cases for Alan D Albright of W.D. Tex., http://law.lexmachina.com/court/txwd/judge/5198506/cases?status=open&filed_on-from=2020-02-19&filed_on-to=2020-04-19&pending-, 7 pages.
Lex Machina, Motion Metrics Report for 834 orders issued by District Judge Alan D Albright (ADA) in 1,603 cases from the Search for federal district court cases before Judge Alan D Albright, https://law.lexmachina.com/motions/motion_metrics?cases_key=yyix9Y8-k2k, generated on Sep. 23, 2020, 1 page.
Lex Machina, 6:20-cv-00200-ADA, *Kerr Machine Co.v. Vulcan Industrial Holdings, LLC* Docket Entries, https://law. exmachina.com/cases/2004206451#docket-entries, 6 pages.
Jonathan Maes, "Machining Square Inside Corners: Conquer the Nightmare!," accessed Sep. 8, 2020, https://makeitfrommetal.com/machining-square-inside-corners-the-night., 22 pages.
Ross Mackay, "Process Engineering: Properly seal that pump," May 17, 2005, https://www.chemicalprocessing.com/articles/2005/465, 11 pages.
MSI Fluid End Components, https://www.scribd.com/document/421304589/Fluid-End, 1 page.
MSI Dixie Iron Works, Ltd., MSI QI-1000 Technical Manual for 1000 HP Quintuplex MSI QI-1000 Pump, Feb. 21, 2004, 90 pages.
MSI, Product Listing and Pricing, accessed Mar. 8, 2016, 19 pages.
National Oilwell Varco, 267Q-6M Quinuplex Plunger Pump: Parts List, Jul. 21, 2008, 13 pages.
Oil and Gas Well Servicing, Audit Procedures for Oil and Gas Well Servicing, May 2010, Texas Comptroller of Public Accounts, Audit Division, 68 pages.
Fony Atkins and Marcel Escudier, Oxford Dictionary of Mechanical Engineering, Oxford University Press, 2013, 10 pages.
Parker Hannifin Corporation and Autoclave Engineers, Technical Information, 2016, 16 pages.
Girdhar, Moniz and Mackay, "Chapter 5.4 Centrifugal pump design," Plant and Process Engineering 360, 2010, pp. 519-536.
Parker Hannifin Corporation, PolyPak Seals for Hydraulic Applications Catalog EPS 5370_PolyPak, 2015, 38 pages.
Paresh Girdhar and Octo Moniz, "Practical Centrifugal Pumps—Design. Operation and Maintenance," Newnes, 2005, 33 pages.
Reinhard Preiss, "Stress concentration factors of flat end to cylindrical shell connection with a fillet or stress relief groove subjected to internal pressure," 1997, Int. J. Pres. Ves & Piping, vol. 73, pp. 183-190.
Caterpillar, WS255 Quintuplex Well Stimulation Pump, 2 pages.
Gardner Denver Pumps, Redline Series Brochure, 3 pages.
Eaton Aerospace Group, Resilient Metallic Seals, TF100-35D, Oct. 2013, 60 pages.
Scott McKeown, "District Court Trial Dates Tend to Slip After PTAB Discretionary Denials - Patents Post-Grant," Jul. 24, 2020, Ropes & Gray, accessed Sep. 23, 2020, 3 pages.
Ricky Smith and R. Keith Mobley, "Rules of Thumb for Maintenance and Reliability Engineers—Chapter 14: Packing and Seals," Elsevier, 2008, pp. 239-250.
Schlumberger, Jet Manual 02—Reciprocating Pumps, Aug. 7, 2015, 63 pages.
Schlumberger, Treating Equipment Manual: Fluid Ends, Section 10, Apr. 2000, 87 pages.
SPM Oil & Gas, SPM QEM 3000 Frac Pump, 2021, 4 pages.
Supplemental Declaration of Steven M. Tipton, Ph.D., P.E.—Case PGR2020-00065, U.S. Pat. No. 10,591,070, Mar. 2, 2021, 35 pages.
Servagroup, TPD 600 Triplex Pump Brochure, Mar. 24, 2011, 2 pages.
Utex Industries, Inc., Well Service Products Catalog, Jun. 2017, 51 pages.
Utex Industries, Inc., Well Service Packing—Packing Assemblies Complete & Replacement, May 2013, 40 pages.
Vargus Ltd., Groove Milling High Precision Tools for Groove Milling, Dec. 2012, pp. 2-22.
Declaration of Duncan Hall from Internet Archive/Wayback Machine, Feb. 3, 2021, Kerr Plunger Pump Manuals, 20 pages.
Michael Agnes, Editor, Webster's New World College Dictionary, Fourth Edition, 1999, 5 pages.
WEIR SPM Oil & Gas, Grooveless Fluid End, 2008, 1 page.
WEIR SPM Oil & Gas, Weir SPM General Catalog, 2009, 40 pages.
WEIR SPM Oil & Gas, Well Service Pump Reference Guide, 2008, 55 pages.
*Intellectual Ventures I LLCv VMWare, Inc.*, Case No. 1:19-CV-01075-ADA, Document 91 (W.D. Tex Jun. 3, 2020), Defendant VMWare, Inc.'s Stipulation of Invalidity Contentions for U.S. Pat. No. 7,949,752, Jun. 3, 2020, 5 pages.
*Vulcan Industrial Holding, LLC et al.v. Kerr Machine Co.* Case No. 4:21-cv-433, Document 1, Complaint for Declaratory Judgment of Patent Non-lnfringement, Feb. 9, 2021, 17 pages.
*Trilogy Enterprises, Inc.,* v. *Trilogy Education Services, LLC*, Case. No. 6:19-cv-199-ADA-JCM, Document 35, Fifth Amended Scheduling Order, Sep. 8, 2020, 4 pages.
*Dr. Corneliu Bolboceanv Baylor University*, Case No. 6:19-CV-00465-ADA-JCM, Document 34, Scheduling Order, Apr. 6, 2020, 4 pages.
*Kerr Machine Co.*, v *Vulcan Energy Services, LLC, Vulcan Industrial Holdings, LLC, and Cizion, LLC d/b/a/ Vulcan Industrial Manufacturing*, Case No. 6:21-CV-00044-ADA, Document 4,

(56) References Cited

OTHER PUBLICATIONS

Plaintiffs Amended Complaint for Patent nfringement and Jury Demand, Jan. 19, 2021, 30 pages.
*Kerr Machine Co., v Vulcan Energy Services, LLC, Vulcan Industrial Holdings, LLC, and Cizion, LLC d/b/a/ Vulcan Industrial Manufacturing*, Case No. 6:21-CV-00044, Document 1, Plaintiffs Original Complaint for Patent Infringement and Jury Demand, Jan. 19, 2021, 47 pages.
*Kerr Machine Co., v Vulcan Energy Services, LLC, Vulcan Industrial Holdings, LLC, and Cizion, LLC d/b/a/ Vulcan Industrial Manufacturing*, Case No. 6:21-CV-00044-ADA, Document 10, Plaintiffs Second Amended Complaint for Patent Infringement and Jury Demand, Feb. 1, 2021, 88 pages.
*Kerr Machine Co., v Vulcan Industrial Holdings, LLC, Vulcan Energy Services, LLC, Cizion, LLC*, Case No. W-20-CV-00200-ADA-24, Order Setting Trial Date, Jun. 14, 2020, 1 page.
*Kerr Machine Co., v Vulcan Industrial Holdings, LLC, Vulcan Energy Services, LLC, Cizion, LLC*, Case No. W-20-CV-00200-ADA-29, Order Setting Trial Date, Aug. 2, 2020, 1 page.
*Kerr Machine Co., v. Vulcan Industrial Holdings, LLC*, Case. No. 6:20-CV-00200-ADA, Affidavit of Service, Apr. 7, 2020, 1 page.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Plaintiffs First Amended Complaint for Patent Infringement and Jury Demand, Jun. 4, 2020, 11 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Document 26, Defendant Cizion, LLC d/b/a Vulcan Industrial Manufacturing, LLC's Motion to Dismiss or Transfer, Jul. 22, 2020, 10 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Opposed Motion to Stay Litigation Pending the Outcome of the Pending Post-Grant Review Proceeding Before the Patent Trial and Appeal Board, Jul. 31, 2020, 14 pages.
*Kerr Machine Co., v Vulcan Industrial Holdings, LLC*, Case No. 6:20-CV-00200-ADA, Plaintiffs Preliminary nfringement Contentions, May 22, 2020, 50 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Preliminary Invalidity Contentions, Aug. 13, 2020, 29 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Document 34, Scheduling Order, Aug. 11, 2020, 3 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Document 38, Plaintiffs Second Amended Complaint for Patent Infringement and Jury Demand, Sep. 25, 2020, 11 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Document 5, Standing Order regarding Scheduled Hearings in Civil Cases in Light of Chief Judge Garcia's 24 Amended Order, Mar. 24, 2020, 4 pages.
*Kerr Machine Co., v Vulcan Industrial Holdings, LLC, Vulcan Energy Services, LLC, and Cizion, LLC d/b/a/ Vulcan Industrial Manufacturing*, Civil Docket for Case No. 6:20-cv-00200-ADA, accessed Sep. 11, 2020, 7 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Document 54, Claim Construction Order, Dec. 3, 2020, 3 pages.

*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Docket Entry, Aug. 2, 2020, 1 page.
*Kerr Machine Co., v Vulcan Industrial Holdings, LLC*, Case No. 6:20-CV-00200, Document 1, Plaintiffs Original Complaint for Patent Infringement and Jury Demand, Mar. 19, 2020, 39 pages.
*Adriana del Rocio Barberena-Rovira, et al., v Kuiper Dairy, LLC*, et al., Case No. 6:20-CV-00250-ADA-JCM, Document 20, Scheduling Order, Jul. 22, 2020, 4 pages.
*Acquanlan Deonshay Harrisv. Cenlar, FSB*, Case No. 6:20-CV-00271-ADA-JCM, Document 13, Scheduling Order, Aug. 20, 2020, 4 pages.
*Senior Living Properties, LLCc. Ironshore Speciality, Insurance Company*, Case No. 6:20-CV-00282-ADA-JCM, Document 12, Scheduling Order, Jul. 7, 2020, 4 pages.
*Dionne Bracken, Individually and as Next Friend of A.M.B., v Michael D. Ashcraft and Envirovac Waste Transport Systems, Inc.*, Case No. 6:20-CV-00308-ADA-JCM, Document 17, Scheduling Order, Jul. 28, 2020, 4 pages.
*Kendra Coufalv. Roger Lee Thomas and Apple Logistics, Inc.*, Case No. 6:20-CV-00356-ADA-JCM, Document 12, Scheduling Order, Jul. 28, 2020, 4 pages.
*Tipton International, Inc., v. Vetbizcorp, LLC and Samuel Cody*, Case No. 6:20-CV-00554-ADA-JCM, Document 8, Scheduling Order, Aug. 20, 2020, 4 pages.
*Dynaenergetics GmbH & Co. KG and Dynaenergetics US, Inc., v. Hunting Titan, Ltd.; Hunting Titan, Inc.; and Hunting Energy Services, Inc.*, Case No. H-17-3784, Order, Sep. 4, 2020, 2 pages.
Slip Opinion, In re Sand Revolution LLC, Case No. 2020-00145 (Fed. Cir. Sep. 28, 2020), 3 pages.
In re Vulcan Industrial Holdings, LLC, Case No. 2020-00151 (Fed. Cir. Sep. 29, 2020), Petition for Writ of Mandamus, 43 pages.
*Densys Ltd., v. 3Shape Trios A/S and 3Shape A/S*, Case No. WA:19-CV-00680-ADA, Document 27, Scheduling Drder, Apr. 8, 2020, 4 pages.
*Kerr Machine Co.vs. Vulcan Industrial Holdings, LLC*, Case No. WA:20-CV-00200-ADA, Order Setting Markman Hearing, May 29, 2020, 1 page.
U.S. Appl. No. 17/241,680 titled "Fluid End and Center Feed Suction Manifold" filed Apr. 27, 2021 lacks reference in file wrapper but has been considered (abandoned before publication).
White Star Pump Co., "Maintenance Manual: Triplex Pump WS-1300/1600," 2005, http://www.whitestarpump.com/ES/iocs/user_t.pdf, 45 pages.
KerrPumps, "Super Stainless Steel Better Than The Best," http://kerrpumps.com/superstainless? gclid=EAIalQobChMlg47o-482q6wlVilTICh2XPA-qEAAYASAAEgKrxPD_BwE, 2013, last accessed: Aug. 21, 2020, 6 pages.
KerrPumps, "Frac One Pumps—Fluid End—Fracing," http://kerrpumps.com/fracone, 2013, last accessed: Aug. 21, 2020, 3 pages.
Kerrpumps, "KerrPumps—Frac Pump & Mud Pump Fluid End—Fluid End Pump," http://kerrpumps.com/fluidends, 2013, last accessed: Aug. 21, 2020, 6 pages.
Vulcan Industrial, "Vulcan," http://www.vulcanindustrial.com/, 2019, last accessed: Aug. 21, 2020, 3 pages.
Vulcan Industrial, "Vulcan," http://www.vulcanindustrial.com/fluid-ends/, 2019, last accessed: Aug. 21, 2020, 3 pages.
Covert Manufacturing, Inc., "Fluid End Block: Covert Manufacturing", (site visited Jul. 30, 2021), covertmfg.com, URL <http://www.covertmfg.com/our-capabilities/fluid-end-block/> (Year: 2021).
Kerr Pumps, "the most advanced fluid ends", (site visited Aug. 5, 2021), Kerrpumps.com, URL: <http://kerrpumps.com/fluidends> (Year: 2021).
Shandong Baorun, 2250 Triplex Plunger Pump Fluid End Exchangeable with Spm, (site visited Aug. 5, 2021), made-in-china.com, URL: <https://sdbaorun.en.made-in-china.com/product/wNixIDXYrshL/China-2250-Triplex-Plunger-Pump-Fluid-End-Exchangeable-with-Spm.html> (Year: 2021).
John Miller, "The Reciprocating Pump, Theory, Design and Use," 1995, 2nd Edition, Krieger Publishing Company, Malabar, Florida, 1 page.

(56) References Cited

OTHER PUBLICATIONS

"QIH-1000 HP Quintuplex," Dixie Iron Works, 2017, htttps://web.archive.org/web/20171031221150/http:/www.diwmsi.com/pumping/qi-1000/.
Technical Manual MSI Hybrid Well Service Pump Triplex and Quintuplex Models, Dixie Iron Works, Mar. 12, 2019, 38 pages.
Carpenter, "CarTech Ferrium C61 Data Sheet," 2015, 2 pages.
The American Heritage Dictionary, Second College Edition, 1982, 6 pages.
Matthew Bultman, "Judge in West Texas Patent Hot Spot Issues Revised Guidelines," Sep. 23, 2020, Bloomberg Law News, 3 pages.
David L. Taylor, "Machine Trades Blueprint Reading: Second Edition," 2005, 3 pages.
Blume, U.S. Pat. No. 6,544,012, issued Apr. 8, 2003, Fig. 12A.
Caterpillar, "Cat Fluid Ends For Well Stimulation Pumps," 2015, 2 pages.
Claim Chart for U.S. Pat. No. 6,544,012, 23 pages.
Claim Chart for U.S. Pat. No. 7,186,097, 22 pages.
Claim Chart for U.S. Pat. No. 7,845,413, 8 pages.
Claim Chart for U.S. Pat. No. 9,534,472, 8 pages.
Claim Chart for U.S. Pat. Pub. No. 2013/0319220, 17 pages.
Claim Chart for U.S. Pat. Pub. No. 2014/0348677, 10 pages.
Claim Chart for U.S. Pat. Pub. No. 2015/0132157, 23 pages.
Claim Chart for "GD-3000," 9 pages.
Claim Chart for "NOV-267Q," 14 pages.
Collins English Dictionary, "annular," https://www.collinsdictionary.com/us/dictionary/english/annular, 2021, 4 pages.
Collins English Dictionary, "circumference," https://www.collinsdictionary.com/us/dictionary/english/circumference, 2021, 7 pages.
Collins English Dictionary, "plug," https://www.collinsdictionary.com/us/dictionary/english/plug, 2021, 17 pages.
Collins English Dictionary, "profile," https://www.collinsdictionary.com/us/dictionary/english/profile, 2021, 10 pages.
Collins English Dictionary, "sleeve," "therethrough," "through," "tube," and "tubular," 8 pages.
Collins English Dictionary, "space," https://www.collinsdictionary.com/US/dictionary/english/space, 2021, 13 pages.
Collins English Dictionary, "stairstep," https://www.collinsdictionary.com/US/dictionary/english/stairstep, 2021, 3 pages.
Congressional Record—Extensions of Remarks, Apr. 18, 2007, pp. E773-E775.
Congressional Record, Mar. 7, 2011, 31 pages.
"Declaration of Steven M. Tipton, Ph.D., P.E., Submitted with Patent Owner's Preliminary Response," Sep. 11, 2020, 155 pages.
"Declaration of William D. Marscher, P.E.—U.S. Pat. No. 10,914,171," Feb. 11, 2021, 308 pages.
"Declaration of William D. Marscher, P.E.—U.S. Pat. No. 10,591,070," May 25, 2020, 209 pages.
Email dated Sep. 22, 2020 in PGR2020-00065, 3 pages.
Email dated Sep. 25, 2020 in *Kerr Machinev Vulcan Industrial Holdings*, 1 page.
U.S. Pat. No. 10,288,178, 353 pages.
U.S. Pat. No. 10,519,950, 142 pages.
U.S. Pat. No. 10,591,070, 168 pages.
U.S. Appl. No. 16/722,139, 104 pages.
U.S. Appl. No. 13/773,271, 250 pages.
U.S. Appl. No. 15/719,124, 183 pages.

\* cited by examiner
‡ imported from a related application

COMPOSITE VALVE SEAT SYSTEM AND METHOD

CROSS REFERENCE TO RELATED APPLICATIONS

This application is a continuation of U.S. patent application Ser. No. 16/746,519 filed Jan. 17, 2020 titled "COMPOSITE VALVE SEAT SYSTEM AND METHOD," the full disclosure of which is hereby incorporated herein by reference in its entirety for all purposes.

TECHNICAL FIELD

Embodiments of the subject matter disclosed herein generally relate to pump systems, and in particular to valve seats in pump systems.

BACKGROUND

Pumping systems may be used in a variety of applications, especially industrial applications where pumping systems are used to elevate a working fluid pressure. One such application is hydraulic fracturing systems, which high pressure pumps are used to increase a fluid pressure of a working fluid (e.g., fracturing fluid, slurry, etc.) for injection into an underground formation. The working fluid may include particulates, which are injected into fissures of the formation. When the fluid is removed from the formation, the particulates remain and "prop" open the fissures, facilitating flow of oil and gas. In many applications, reciprocating pumps are used where a fluid is introduced into a fluid end inlet passage and out through an outlet passage. A valve assembly reciprocates within the pump and contacts valve seats at the inlet and outlet passages. Due to the particulates and corrosive nature of the working fluid, the valve seats may become eroded or otherwise damaged, which my prevent sealing of the inlet and outlet passages.

SUMMARY

Applicants recognized the problems noted above herein and conceived and developed embodiments of systems and methods, according to the present disclosure, for valve seats in pump systems.

In accordance with one or more embodiments a valve assembly for a fracturing pump includes a valve seat having a bore extending therethrough, the valve seat including a strike face at a top region opposite a bottom region, at least a portion of the strike face formed by an insert positioned within a groove formed in the valve body. The valve assembly also includes a bore liner arranged within the bore, at least a portion of an axial length of the bore liner covering at least a portion of the ceramic to form a barrier between the insert and the bore. The valve assembly further includes a valve member positioned to reciprocate within the bore, the valve member moving between an open position and a closed position, wherein at least a portion of the valve member engages at least a portion of the strike face in the closed position.

In accordance with another embodiment, a valve seat for use in a fracturing pump includes a first body, including at least a portion of a bore and having a first diameter. The valve seat also includes a second body, coupled to the first body. The second body includes a tapered portion having a downward slope from a second diameter to an axis, a groove formed in the tapered portion, the groove extending from at least a second portion of the bore radially outward toward the second diameter, and an insert, positioned within the groove, the insert having a sloped region substantially conforming to the downward slope of the tapered portion. The valve seat also includes a bore liner extending through the bore along at least a portion of both the first body and the second body, the bore liner positioned to overlap at least a portion of the insert.

In accordance with another embodiment, a method for forming a valve seat includes receiving a valve seat, the valve seat including a first body and a second body coupled together, the first body having a larger diameter than the second body, the second body including a tapered portion. The method also includes forming a groove in the tapered portion, the groove extending radially outward from the bore. The method further includes positioning an insert within the groove. The method also includes securing the insert within the groove. The method includes positioning a bore liner along at least a portion of the bore, the bore liner arranged to overlap at least a portion of the insert. The method further includes securing the bore liner to at least one of the bore or the insert.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

Figure 1:
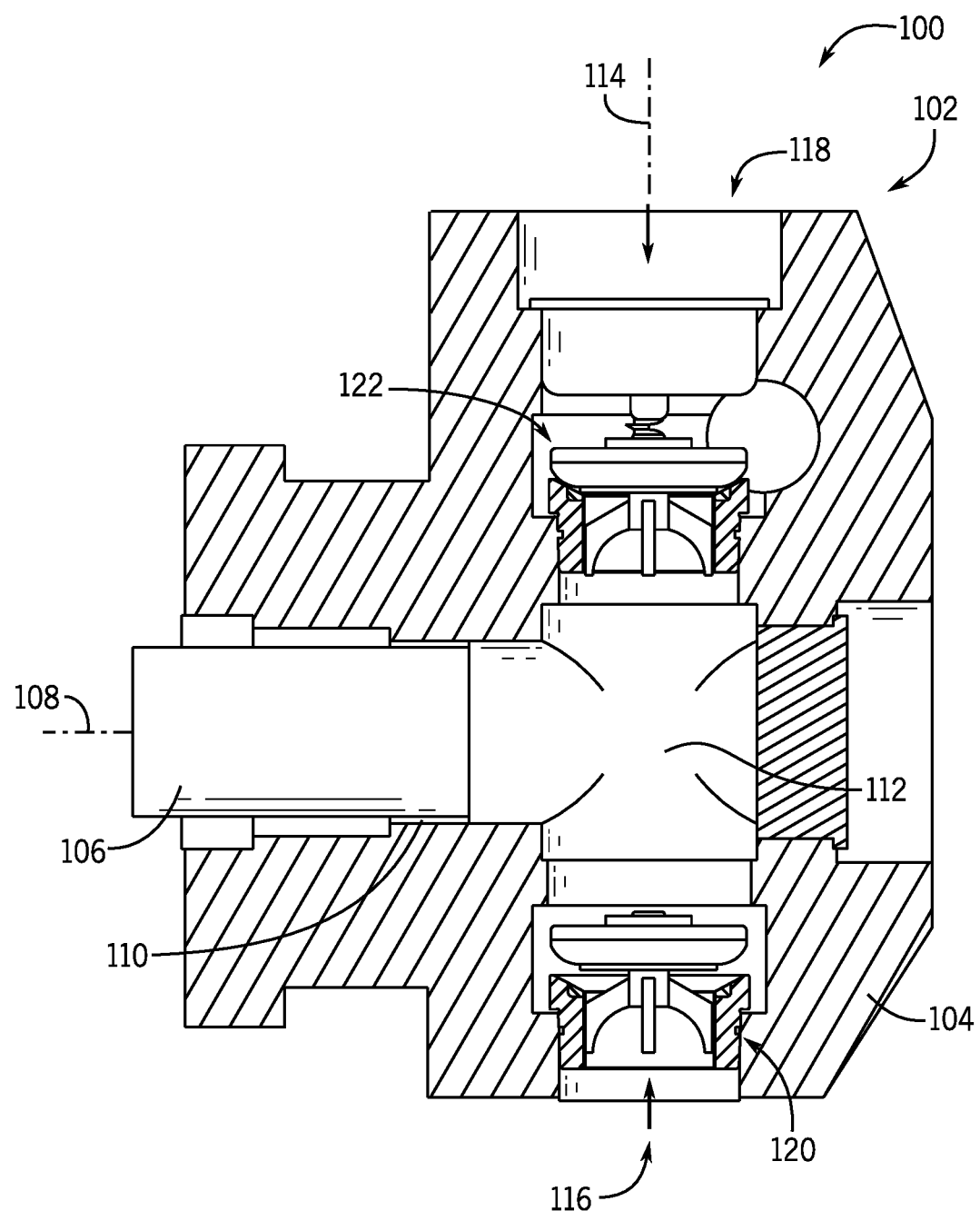
FIG. 1 is a schematic cross-sectional view of an embodiment of a pump assembly, in accordance with embodiments of the present disclosure.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

Embodiments of the present disclosure include a valve seat at least partially formed of a ceramic material on at least a portion of a strike face. Moreover, the valve seat may include an inner flow bore including a wear resistant metallic or polymeric material. In various embodiments, the wear resistant metallic or polymeric material may be fixed to the inner flow bore by bonding, press fitting, sintering, or a combination thereof. The valve seat may include a first and second body, the first body having an outer diameter configured to be inserted into a fluid passageway of a fracturing pump, such as a reciprocating pump. The second body extends radially from the first body, and may be considered integral to the first body in embodiments, and has an outer diameter greater than the outer diameter of the first body. The second body is at least partially formed of a ceramic material. In various embodiments, the second body includes an insert comprising a ceramic material, which may be fixed to the second body by bonding, press fitting, sintering, or a combination thereof.

In various embodiments, systems and methods for forming a valve seat used in positive displacement reciprocating pumps and hydraulic fracturing service designed to pump sand water acid slurry are described. The valve seat is designed to have a wear resistant valve strike face and inner flow bore to extend a service life of the valve seat before replacement or repair. Embodiments may provide significant extension of services lives of the valve seat compared to conventional case-hardened alloy steel valve seats. Prior art valve seats have issues with the strike face wearing down and the inner flow bore eroding or becoming gouged due to the up and down action of the valve wing guided portion. Prior art valve seats including a ceramic insert on the strike face do not have a liner system to prevent contact damage with valve guide legs or erosive damage from fluid flow. In embodiments, the valve strike face is partially formed of ceramic material, such as cemented tungsten carbide or similar, to increase wear resistance of the strike face of the valve seat. Moreover, the inner flow bore of the valve seat is formed of an inner layer of wear resistant metallic or polymer material to prevent flow accelerated erosion of the valve seat flow bore and prevent gouging from up and down motion of the valve which has wing guided feet.

FIG. 1 is a schematic cross-sectional view of an embodiment of a pump assembly 100, which may also be referred to as a reciprocating pump assembly and/or a reciprocating pump. The pump assembly 100 may be utilized during hydraulic fracturing operations, among other operations, where a working fluid (e.g., fracturing fluid, slurry, etc.) is introduced into the pump and energy is added to the working fluid to increase a pressure of the working fluid. Fracturing fluid, by way of example only, may include corrosives and also particulates, such as sand or ceramics, which are utilized during fracturing operations. These corrosives and particulates cause erosion within the pump assembly 100, which may undesirably affect fracturing operations and lead to down times to replace various components. Additionally, the fracturing fluids may include corrosive acids and the like, which may wear down components of the pump assembly 100.

It should be appreciated that various components of the pump assembly 100 have been removed for clarity with the following discussion. For example, a power end has been removed in favor of focusing on the illustrated fluid end 102 of the pump assembly 100. The power end may include a crankshaft that is driven by an engine or motor to facilitate operations. The fluid 102 includes a fluid end block 104 that may house one or more components discussed herein. A plunger rod 106 is driven (e.g., via the crankshaft) to reciprocate within the fluid end block 104 along a plunger axis 108. The plunger rod 106 is positioned within a bore 110 extending through at least a portion of the fluid end block 104. The illustrated bore 110 is arranged along the plunger axis 108 (e.g., first axis) and intersects a pressure chamber 112, which is arranged along a pressure chamber axis 114 (e.g., second axis), which is positioned substantially perpendicular to the plunger axis 108. It should be appreciated that the pump assembly 100 may include multiple plunger rod and pressure chamber arrangements, which may be referred to as a plunger throw. For example, the pump assembly 100 may be a triplex pump, quadplex pump, quintuplex pump, and the like.

The illustrated fluid end block 104 includes an inlet passage 116 and an outlet passage 118, which are generally coaxial and arranged along the pressure chamber axis 114. In other words, the inlet and outlet passages 116, 118 are axially aligned with respect to one another and/or the pressure chamber 112. In various embodiments, fluid enters the pressure chamber 112 via the inlet passage 116, for example on an up stroke of the plunger rod 106, and is driven out of the pressure chamber 112 via the outlet passage 118, for example on a down stroke of the plunger rod 106.

Respective valve assemblies 120, 122 are arranged within the inlet passage 116 and the outlet passage 118. These valve assemblies 120, 122 are spring loaded in the illustrated embodiment, but it should be appreciated that such an arrangement is for illustrative purposes only. In operation, a differential pressure may drive movement of the valve assemblies. For example, as the plunger rod 106 is on the upstroke, pressure at the inlet passage 116 may overcome the spring force of the valve assembly 120, thereby driving fluid into the pressure chamber 112. However, on the down stroke, the valve assembly 120 may be driven to a closed positon, while the spring force of the valve assembly 122 is overcome, thereby enabling the fluid to exit via the outlet passage 118.

As will be described in detail below, the valve assemblies 120, 122 may include a valve seat face, which may include a strike face. The strike face may contact a sealing face of a valve member as the valve member transitions between an open position and a closed position. Due to the nature of the working fluid (e.g., corrosive and filled with particulates), wear may develop along the strike face, thereby reducing its sealing effectiveness.

Figure 2:
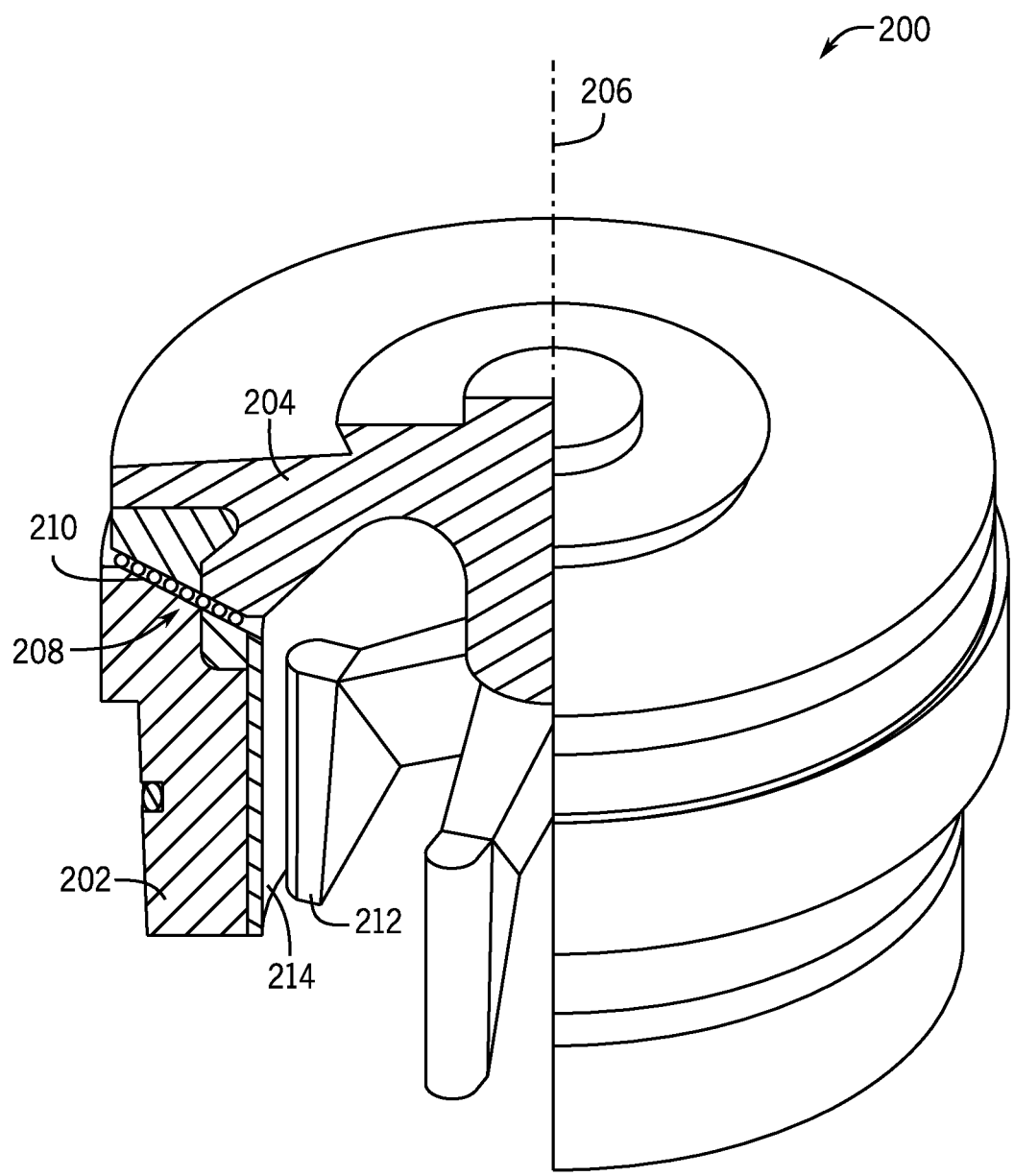
FIG. 2 is a schematic sectional view of an embodiment of a valve assembly, in accordance with embodiments of the present disclosure.

FIG. 2 is a schematic cut away view of an embodiment of a valve assembly 200, such as the valve assemblies 120, 122, which may be utilized with a pump assembly. The illustrated valve assembly 200 includes a valve seat 202 and a valve member 204. In operation, the valve member 204 reciprocates along a valve axis 206, which may correspond to the pressure chamber axis 114, such that the valve member 204 moves into and out of contact with the valve seat 202. In the illustrated embodiment, particulates 208 have accumulated along the valve seat 202, for example at a strike face 210 (e.g., contact face). Repeated contact from the valve member 204 may drive the particulates 208 into the strike face 210, causing scarring or other damage. Additionally, corrosive fluids may contact other portions of the valve seat 202, in addition to the strike face 210. Damage to the valve seat 202 may cause the sealing capability of the valve assembly 200 to degrade, thereby reducing the effectiveness of the pump assembly.

In various embodiments, guide legs 212 of the valve member 204 may also lead to damage to various portions of the valve seat 202. For example, in the illustrated embodiment, the guide legs 212 extend a bore 214 of the valve member 204. Due to the presence of the corrosive fluid and/or the particulates, damage may occur along the bore 214, such as scarring. As a result, the pump assembly may be taken out of service for repairs, which may be expensive and also contribute to non-productive time at the well site. Accordingly, embodiments of the present disclosure are directed toward systems and methods for forming improved valve seats, which may be part of valve assemblies.

Figure 3:
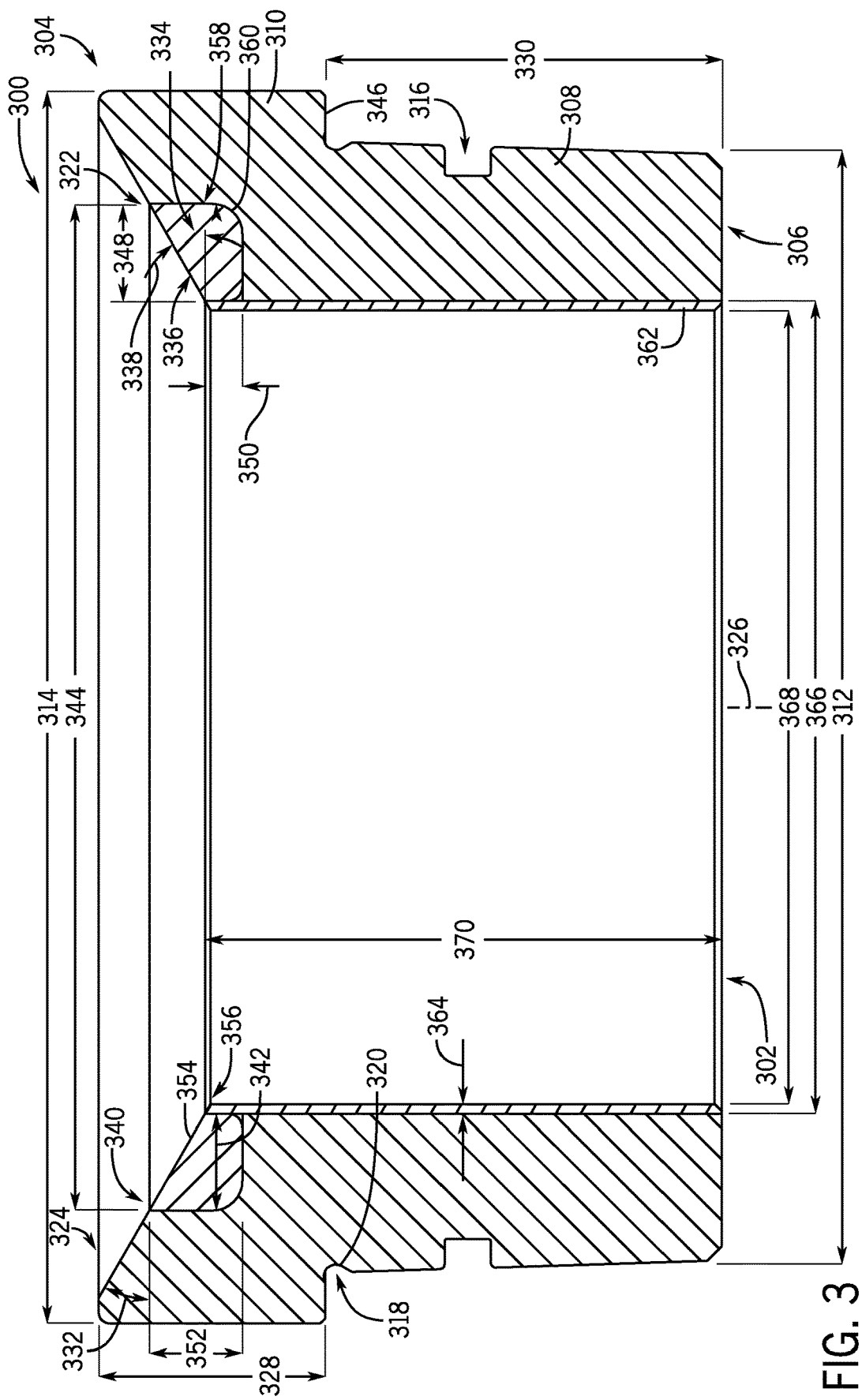
FIG. 3 is a cross-sectional side view of an embodiment of a valve seat, in accordance with embodiments of the present disclosure.

FIG. 3 is a cross-sectional side view of an embodiment of a valve seat 300. The illustrated valve seat 300 may be utilized with a pumping assembly and provide a contact area to engage a valve member in a valve assembly. The illustrated valve seat 300 includes an inner bore 302 that extends from a top region 304 to a bottom region 306. As noted, the recitations of "top" and "bottom" are for illustrative purposes with respect to the disclosed embodiment, but are not intended to limit the disclosure. For example, the "top" may be installed at a vertically lower position than the "bottom."

In various embodiments, the valve seat 300 includes a first body 308 and a second body 310. The first and second bodies 308, 310 may be integrally formed as a unitary component corresponding to the body portion of the valve seat 300. In the illustrated embodiment, the first body 308 includes a first outer diameter 312 and the second body 310 includes a second outer diameter 314. As illustrated, the first outer diameter 312 is less than the second outer diameter 314. It should be appreciated that the first outer diameter 312 is being measured from a radially outward region and not from a seal groove 316 formed in the first body 308. A transition 318 between the first and second body 308, 310 includes a notched region 320. The notched region 320 may be utilized to engage a shoulder formed along a portion of a pressure chamber to secure the valve seat 300 into position. It should be appreciated that the notched region 320 is shown for illustrated purposes only, and that in other embodiments a taper, a bend, or any other transition may be included in place of or in addition to the notched region 320.

The second body 310 includes a strike face 322 extending along a tapered portion 324 of the second body 310. In the illustrated embodiment, the tapered portion 324 has a downward slope from the second outer diameter 314 to a valve seat axis 326. The tapered portion 324 may be described as being constrained to the second body 310, in that the second body 310 may include the region having the second outer diameter 314. In other words, the second body 310 may be defined, in certain embodiments, as the portion of the valve seat 300 extending a first axial distance 328, as opposed to the first body 308 that extends the second axial distance 330 and includes the first outer diameter 312.

The illustrated tapered portion 324 extends circumferentially about the valve seat axis 326 and is arranged at a first angle 332. It should be appreciated that the first angle 332 may be any reasonable angle and may be particularly selected based on operating conditions. For example, the first angle 332 may be approximately 40 degrees. However, the first angle 332 may be approximately 15 degrees, approximately 20 degrees, approximately 25 degrees, approximately 30 degrees, approximately 35 degrees, approximately 45 degrees, approximately 50 degrees, approximately 55 degrees, approximately 60 degrees, approximately 65 degrees, or any other reasonable angle. Moreover, the first angle 332 may be between approximately 15 degrees and 25 degrees, between approximately 25 degrees and 35 degrees, between approximately 35 degrees and 45 degrees, between approximately 45 degrees and 5 degrees, or any other reasonable range.

The strike face 322 forms at least a portion of the tapered portion 324. In various embodiments, the strike face 322 may be considered to cover substantially all of the tapered portion 324. However, in other embodiments, the strike face 322 may be defined as including a portion of the tapered portion 324 that corresponds to a contact region with a valve member 204. This contact region may vary based on the configuration of the valve member. In the illustrated embodiment, an insert 334 is installed along the tapered portion 324 and forms at least a portion of the strike face 322. As noted above, the insert 334 may be a ceramic or high strength material that is positioned to engage the valve member 204 when the valve member 204 is brought into engagement with the valve seat 300.

The illustrated insert 334 includes a sloped region 336 that is substantially equal to the tapered portion 324, thereby forming a smooth sloping surface along the valve seat 300. It should be appreciated that the sloped region 336 may be arranged at a different angle 338 than the angle 332. For example, the sloped region 336 may be positioned at a steeper angle or shallower angle, thereby providing additional options for adjustment due to expected operating conditions. The insert 334 extends circumferentially about the tapered portion 324 and is positioned within a groove 340 that extends radially outward from the bore 302. In other words, an inner portion of the grove 340 may be formed, at least in part, by the bore 302 and an outer portion of the groove 340 may be formed, at least in part, by the second body 310. The groove 340 includes a radial distance 342, which forms a groove diameter 344 that is less than the first outer diameter 312. However, it should be appreciated that, in other embodiments, the groove diameter 344 may be equal to the first outer diameter 312 or greater than the first outer diameter 312. In the illustrated embodiment, the groove 340 does not extend to a shoulder 346 of the second body 310. The shoulder 346 may be utilized to secure the valve seat 300 within the pump assembly. As noted above, while the shoulder 346 is illustrated as a substantially squared-off or straight shoulder, it should be appreciated that other arrangements (e.g., sloped, curved, etc.) may be provided and may be based, at least in part, on the transition 318.

In various embodiments, the insert 334 includes an insert width 348, which may be substantially equal to the radial distance 342, and as a result, the insert 334 may not extend into the bore 302. However, in embodiments, the insert 334 may extend into the bore, for example, when the insert width 348 is greater than the radial distance 342. The illustrated insert 334 further includes a first height 350 and a second height 352, the first height 350 being less than the second height 352, and being connected via a contact surface 354 forming at least a portion of the sloped region 336. In operation, the valve member will contact at least a portion of the contact surface 354. However, because the insert 334 is formed from a hard material, such as ceramic, damage will take longer to accumulate, thereby increasing the life of the valve seat 300.

As shown, both a first end 356, having the first height 350, and a second end 358, having the second height 352, are substantially parallel to the valve seat axis 326. In other words, the illustrated ends 356, 358 are substantially straight with respect to the bore 302. However, it should be appreciated that such an arrangement is for illustrative purposes only. For example, the first or send ends 356, 358 may be sloped. Additionally, the insert 334 is illustrated with a curved end 360 at the second end 358. Again, the curvature is for illustrative purposes and may be an angle or the like, however, it should be appreciated that the curvature may facilitate transmission of forces.

Inclusion of the insert 334 enables improved longevity of the valve seat 300 because the region(s) in contact with the valve member may be formed from stronger and/or harder materials, which may be less susceptible to wear. However, improving the longevity of the strike face 322 may be insufficient if the bore 302 experiences significant damage. In other words, the valve seat 300 may be replaced and/or repaired due to damage at any region, not just the strike face 322. Accordingly, embodiments of the present disclosure include a bore liner 362 extending through at least a portion of the bore 302. The illustrated bore liner 362 protects the bore 302 from damage, for example, from the guide legs 212. For example, the bore liner 362 may be formed from a high strength material, such as a wear resistant metallic alloy, or from a polymer material. The illustrated bore liner 362 has a thickness 364, which may slightly reduce a bore diameter 366. It should be appreciated that the bore diameter 366 and/or the thickness 364 may be particularly selected such that a liner inner diameter 368 is substantially equal to a prior art bore diameter.

The illustrated bore liner 362 extends for an axial length 370 and covers at least a portion of the insert 334. That is, at least a portion of the first insert height 350 is overlapped by at least a portion of the axial length 370. It should be appreciated that, in various embodiments, the entirety of the first insert height 350 may be covered by at least a portion of the axial length 370. However, in other embodiments, less than the entire first insert height 350 may be covered. As a result, the bore liner 362 forms at barrier or separation between the insert 334 and the bore 302. In embodiments, installation of the bore liner 362 prior to the insert 334 may facilitate locating and placement of the insert 334. In order words, the insert 334, in embodiments, does not form a portion of the bore 302.

Figure 4:
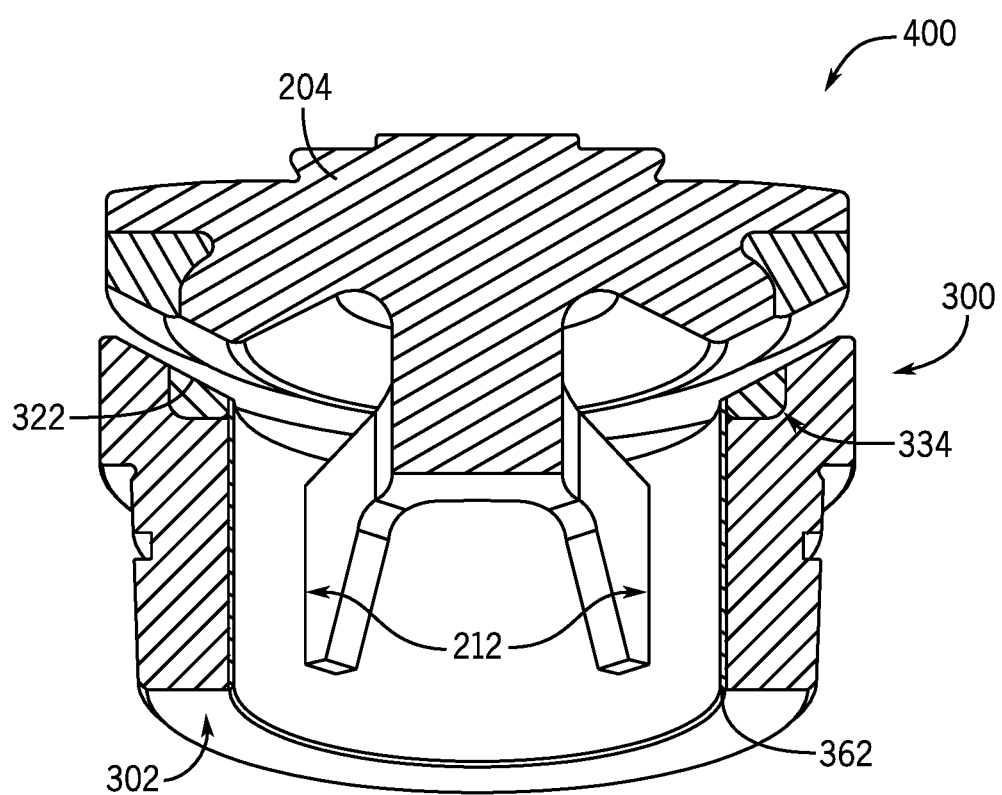
FIG. 4 is a cross-sectional side view of an embodiment of a valve assembly, in accordance with embodiments of the present disclosure.

FIG. 4 is a schematic cross-sectional view of an embodiment of a valve assembly 400 including the valve seat 300 having the insert 334 and the bore liner 362. In the illustrated embodiment, the valve member 204 is positioned within the bore 302 and is arranged to reciprocate between an open position (illustrated) and a closed position (not illustrated). In the closed position, the valve member 204 contacts the strike face 322 of the valve seat 300, for example, at the insert 334. Because the insert 334 is formed from a strong, wear resistant material, repeated contact may have a reduced impact and lead to a longer life for the valve seat 300. Moreover, as noted above, reciprocation may cause contact between the guide legs 212 and the bore liner 362. However, due to the strength of the bore liner 362, wear along the bore 302 is reduced, which also improves the life of the valve seat 300.

Figure 5:
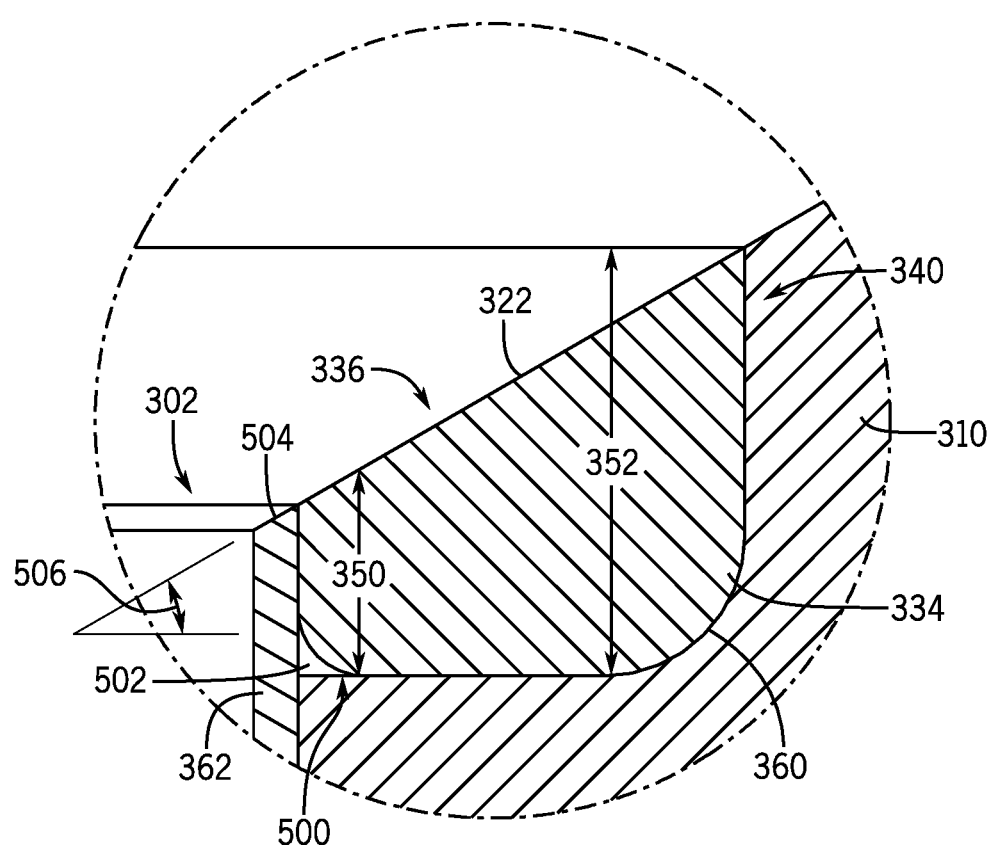
FIG. 5 is a detailed cross-sectional side view of an embodiment of a tapered portion of a valve seat, in accordance with embodiments of the present disclosure.

FIG. 5 is a detailed cross-sectional view of an embodiment of a portion of the second body 310 including the insert 334 arranged within the groove 340. The illustrated groove 340 includes a curved portion that receives the curved end 360 of the insert 334. The insert 334 also includes a second curved end 500 at the first end 346. As a result, there is a gap 502 between the curved end 500 and the bore liner 362. The gap 502 may facilitate expansion of the materials, for example, due to pressure and temperature.

As previously noted, at least a portion of the bore liner 362 may overlap at least a portion of the insert 334. In the illustrated embodiment, the entire first insert height 350 is covered by the bore liner 362. It should be appreciated, as noted above, that the bore liner 362 may not overlap the entire insert 334. However, in various embodiments, at least a portion of the bore liner 362 overlaps at least a portion of the insert 334 to form a barrier between the insert 334 and the bore 302.

The bore liner 362 includes a sloped top 504, arranged at an angle 506, that substantially conforms to the insert angle 338. It should be appreciated that the sloped top 504 may be omitted in other embodiments. That is, the top may be substantially planar. The illustrated portion of the tapered portion 324 is substantially constant. In other words, the angles 332, 338, 506 are substantially equal, thereby forming a smooth transition along the tapered portion 324.

Figure 6:
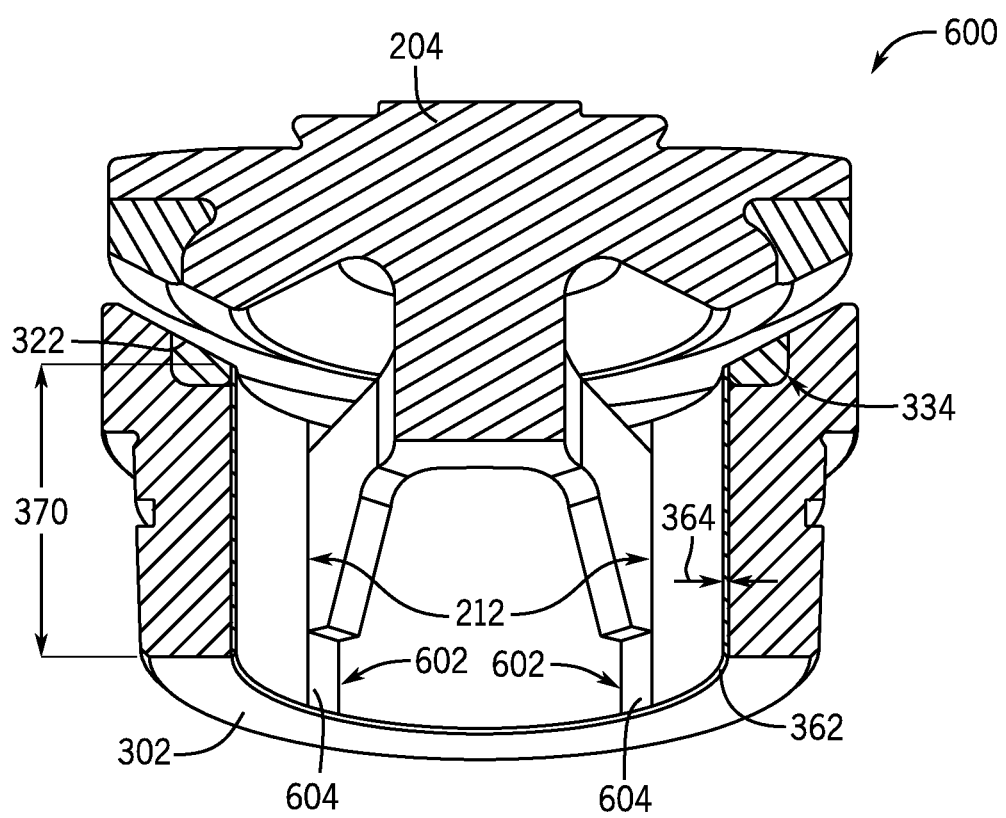
FIG. 6 is a cross-sectional side view of an embodiment of a valve assembly, in accordance with embodiments of the present disclosure.

FIG. 6 is a schematic cross-sectional view of an embodiment of a valve assembly 600 including the valve seat 300 having the insert 334 and the bore liner 362. The illustrated embodiment differs from the embodiment shown in FIG. 4 in that the bore liner 362 includes guides 602 for the guide legs 212. For example, the guides 602 include a recessed portion 604 extending into the liner thickness 364 to receive the legs 212. As a result, rotation of the valve member may be reduced or eliminated due to the fixed location within the guides 602. In various embodiments, the material within the guides 602 may also be different from the material of the remainder of the bore liner 362, due to the concentration of the guide leg movement. For example, the material within the guides 602 may be formed from a high strength or resilient material, which may have increased costs, compared to other portions of the bore line 362. The illustrated guides 602 may extend for the entire axial length 370 of the bore liner 362 or along only a portion of the bore liner 362. As a result, the bore 302 may be protected from wear due to the reciprocating movement of the valve member 204.

Figure 7:
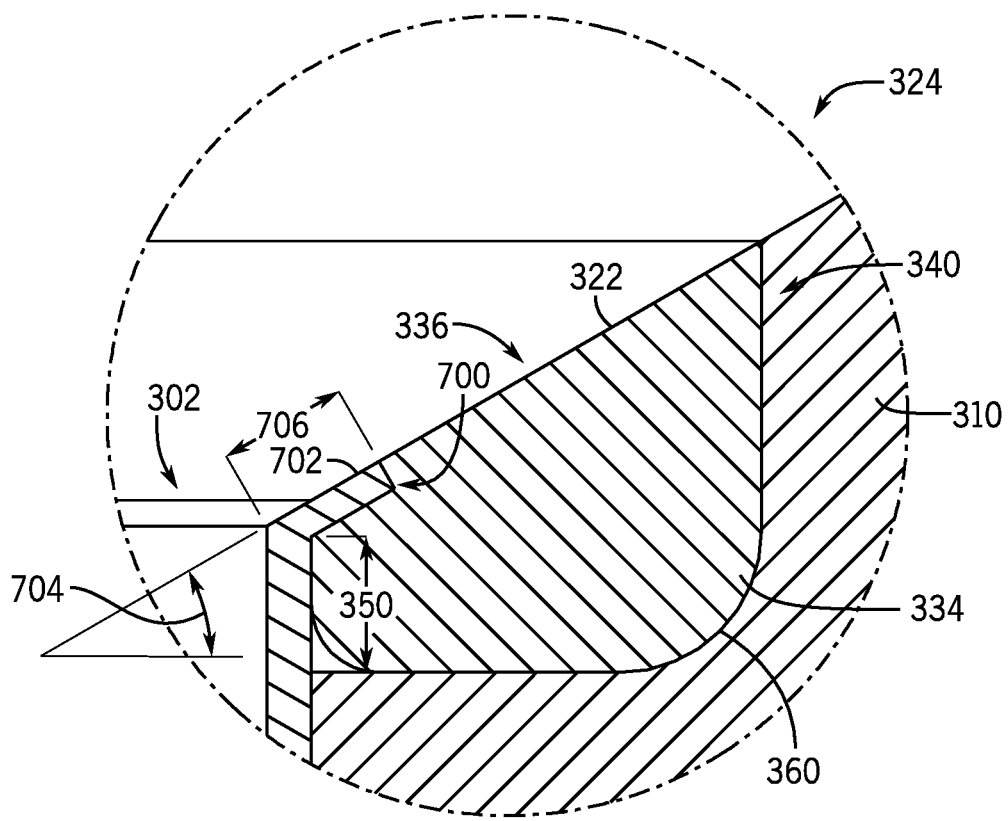
FIG. 7 is a cross-sectional side view of an embodiment of a valve seat, in accordance with embodiments of the present disclosure.

FIG. 7 is a detailed cross-sectional view of an embodiment of a portion of the second body 310 including the insert 334 arranged within the groove 340. In the illustrated embodiment, the bore liner 362 extends to cover the first insert height 350. Moreover, the insert 334 includes a slot 700 for receiving an extension 702 of the bore liner 362. As shown, the extension 702 is positioned within the slot 700 and is arranged at an angle 704, which substantially conforms to the insert angle 338, thereby forming the smooth sloped profile of the tapered portion 324. It should be appreciated that, in various embodiments, an extension length 706 may be particularly selected. For example, the extension 702 may be designed to extend onto the strike face 322 such that the extension 702 is contacted by the valve member 204. However, in other embodiments, the extension 702 may be positioned such that it does not extend to the strike face 322. Moreover, the extension 702 may not be a continuous, circumferential piece, but rather, there may be gaps between a plurality of extensions 702, such that the extensions 702 extend outward like petals or fingers. In various embodiments, the extension 702 may facilitate securing the bore liner 362 to the bore 302 and/or the insert 334. As will be described, the bore liner 362 can be press fit, bonded, or metallurgically fused to the valve seat.

As noted above, embodiments of the present disclosure are directed toward incorporating harder and/or stronger materials into valve seats in order to improve effective life. For example, traditional valve seats may be formed by an alloy steel. Repeated contact with a valve member, which may lead to wear and erosion, especially when utilized with environments with corrosive fluids and/or particulates in the fluid. Embodiments of the present disclosure incorporate high strength materials, such as ceramic materials, resistant steels, or polymers, into the valve seats at areas where contact is made with the valve member. These materials may be incorporated in a variety of ways, such as bonding, press fitting, sintering, or a combination thereof. As a result, a majority of the valve seat may be formed from cheaper materials, such as alloy steels, with more expensive materials being focused at the areas of contact.

Figure 8:
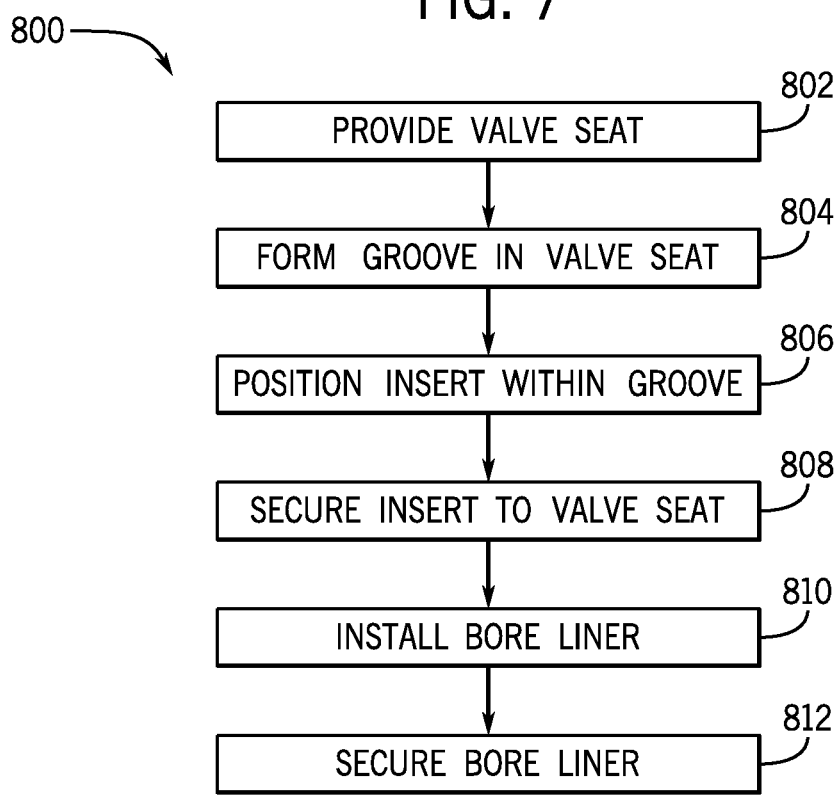
FIG. 8 is a flow chart of an embodiment of a method for forming a valve seat, in accordance with embodiments of the present disclosure.

FIG. 8 is a flow chart of an embodiment of a method 800 for forming a valve seat. It should be appreciated that the method may include additional or fewer steps. Additionally, the steps may be performed in a different order or in parallel. This example begins with providing a valve seat 802. For example, the valve seat may be a forged or machined part that is manufactured to one or more specifications, such as specifications for a particular pump. A groove is then formed in the vale seat 804. The groove may be formed to receive the insert, as described above. It should be appreciated that the valve seat may be provided with the groove. For example, in embodiments where the valve seat is cast, the groove may be part of the casting. The insert is then arranged within the groove 806 and secured to the valve seat 808. For example, the groove may be particularly formed to receive the insert (e.g., matching dimensions). Securing the insert may include a variety of different manufacturing processes such as press fitting, bonding, or metallurgically fusing the insert to the valve seat. As a result, the valve seat may include an improved strike face.

Embodiments of the present disclosure may also be directed toward providing strengthening and protection to the valve bore. For example, a bore liner may be installed within the bore of the valve seat 810. In embodiments, the bore liner is substantially cylindrical, like the bore. Moreover, the bore liner may be sized to engage the bore. For example, the bore liner may have an outer diameter that is substantially equal to the inner diameter of the bore. Thereafter, the bore liner may be secured to the valve bore 812. As noted above, the bore liner may be press fit, bonded, or metallurgically fused to the bore. Additionally, in embodiments, the bore liner may be mechanically coupled to the insert. Accordingly, embodiments of the present disclosure provide a valve seat having protective surfaces arranged along the bore and the strike face.

The foregoing disclosure and description of the disclosed embodiments is illustrative and explanatory of the embodiments of the disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A valve assembly for a fracturing pump, comprising:
a valve seat having a bore extending therethrough, the valve seat including a strike face at a top region opposite a bottom region, at least a portion of the strike face formed by an insert positioned within a groove formed in a valve body;
a bore liner arranged within the bore to overlay at least a portion of the bottom region, at least a portion of an axial length of the bore liner covering at least a portion of the insert to form a barrier between the insert and the bore, the insert having a curved end positioned proximate the bore liner, the bore liner extending to cover at least the curved end;
an overlapping bore liner extension, the overlapping bore liner extension extending into a slot formed in the insert, the overlapping bore liner extension substantially corresponding to a second tapered face of the insert; and
a valve member positioned to reciprocate within the bore, the valve member moving between an open position and a closed position, wherein at least a portion of the valve member engages at least a portion of the strike face in the closed position.

2. The valve assembly of claim 1, the valve seat further comprising:
a first body having a first diameter, at least a portion of the bore extending through the first body; and
a second body having a second diameter, the second diameter being larger than the first diameter, and a tapered portion, the tapered portion forming at least a portion of the strike face.

3. The valve assembly of claim 2, further comprising:
a transition between the first body and the second body, the transition being a substantially right angle to form a shoulder at the second body.

4. The valve assembly of claim 1, wherein the insert is formed from a ceramic material, a wear resistant steel, a polymer, or a combination thereof.

5. The valve assembly of claim 1, wherein the insert is formed from a different material than the valve seat.

6. The valve assembly of claim 1, wherein a top of the bore liner is substantially planar.

7. The valve assembly of claim 1, wherein the insert includes a first end having a first height proximate the bore and a second end having a second height, greater than the first height, distant from the bore, wherein the portion of the axial length of the bore liner is substantially equal to the first height and less than the second height.

8. A valve seat for use in a fracturing pump, comprising:
a first body, including a first bore portion;
a second body, including a second bore portion coupled to and aligned with the first bore portion, the second body comprising:
a tapered portion having a downward slope from a second diameter to an axis;
a groove formed in the tapered portion, the groove extending radially outward from the second bore portion;
an insert, positioned within the groove, the insert having a sloped region substantially conforming to the downward slope of the tapered portion, the insert forming at least part of the second bore portion; and
a bore liner overlapping at least a portion of the insert and extending through at least parts of both the first body and the second body, the bore liner having a smaller bore liner diameter than a bore diameter, the bore liner comprising:

an extension arranged at an angle, the extension being positioned within a slot formed in the insert, the extension forming at least part of the tapered portion.

9. The valve seat of claim 8, wherein the insert is formed from a ceramic material, a wear resistant steel, a polymer, or a combination thereof.

10. The valve seat of claim 8, further comprising:
a transition between the first body and the second body, the transition forming a shoulder for supporting the valve seat within the fracturing pump.

11. The valve seat of claim 8, wherein the insert includes a first curved portion substantially conforming to a curved region of the groove, the curved region being radially outward from the bore diameter.

12. The valve seat of claim 8, further comprising:
a gap between the bore liner and the insert, the gap formed at a second curved portion of the insert, positioned proximate the bore diameter, wherein at least a portion of the second curved portion is overlapped by the bore liner.

13. The valve seat of claim 8, wherein a top of the bore liner is at least one of sloped or planar.

14. The valve seat of claim 8, wherein the insert is coupled to the second body via a bonding process, a press fitting process, a sintering process, or a combination thereof.

* * * * *